United States Patent
Garner et al.

(10) Patent No.: US 11,991,951 B2
(45) Date of Patent: May 28, 2024

(54) AGRICULTURAL SEED LOADING MECHANISM FOR A BELTED CONVEYOR

(71) Applicant: Deere & Company, Moline, IL (US)

(72) Inventors: Elijah B. Garner, Bettendorf, IA (US); Dnyanesh Dhobale, Pune (IN)

(73) Assignee: Deere & Company, Moline, IL (US)

( * ) Notice: Subject to any disclaimer, the term of this patent is extended or adjusted under 35 U.S.C. 154(b) by 627 days.

(21) Appl. No.: 17/307,170

(22) Filed: May 4, 2021

(65) Prior Publication Data

US 2022/0354047 A1    Nov. 10, 2022

(51) Int. Cl.
*A01C 7/12* (2006.01)
*A01C 7/10* (2006.01)
*A01C 15/00* (2006.01)

(52) U.S. Cl.
CPC .............. *A01C 7/127* (2013.01); *A01C 7/105* (2013.01); *A01C 15/006* (2013.01)

(58) Field of Classification Search
CPC ........ A01C 7/127; A01C 7/105; A01C 15/006
See application file for complete search history.

(56) References Cited

U.S. PATENT DOCUMENTS

| | | | |
|---|---|---|---|
| 9,119,339 B2 | 9/2015 | Bergere | |
| 9,485,902 B2 | 11/2016 | Bergere | |
| 9,648,800 B2 | 5/2017 | Garner et al. | |
| 9,795,078 B2 | 10/2017 | Garner et al. | |
| 9,801,328 B2 | 10/2017 | Garner et al. | |
| 9,883,624 B2 | 2/2018 | Helmick et al. | |
| 9,924,628 B2 | 3/2018 | Brockmeier | |
| 2008/0110382 A1 | 5/2008 | Brockmeier | |
| 2011/0192331 A1 | 8/2011 | Bergere | |
| 2016/0128271 A1* | 5/2016 | Garner et al. | A01C 7/16 111/185 |
| 2016/0143213 A1 | 5/2016 | Kowalchuk | |
| 2019/0059207 A1* | 2/2019 | Schoeny et al. | A01C 7/166 |
| 2019/0364718 A1* | 12/2019 | Garner et al. | A01C 7/105 |
| 2020/0000011 A1* | 1/2020 | Hubner et al. | A01C 7/102 |

FOREIGN PATENT DOCUMENTS

| | | |
|---|---|---|
| AU | 2019296496 A1 | 1/2021 |
| EP | 3017676 A1 | 5/2016 |
| EP | 3586583 A1 | 1/2020 |
| WO | WO2020001964 A1 | 1/2020 |

OTHER PUBLICATIONS

Extended European Search Report and Written Opinion issued in European Patent Application No. 22169875.6, dated Oct. 4, 2022, in 08 pages.

* cited by examiner

*Primary Examiner* — Tara Mayo
(74) *Attorney, Agent, or Firm* — Christopher J Volkmann; Kelly, Holt & Christenson, PLLC.

(57) ABSTRACT

An agricultural planting machine includes a seed meter configured to meter seed, a transport mechanism configured to transport the seed to a discharge location, and a loader assembly. The loader assembly includes an element having an actuating surface, a hub configured to rotate relative to the actuating surface, and a compartment supported on the hub and configured to receive the seed from the seed meter and to eject the seed into the transport mechanism, the compartment comprising first and second movable elements that are movably coupled to the hub and configured to engage the actuating surface and move relative to the hub based on rotation of the hub relative to the actuating surface.

20 Claims, 17 Drawing Sheets

AGRICULTURAL SEED LOADING MECHANISM FOR A BELTED CONVEYOR

FIELD OF THE DESCRIPTION

The present description generally relates to planting equipment. More specifically, but not by limitation, the present description relates to a loading mechanism for loading particulate material (e.g., seed, fertilizer, etc.) from a meter to a belted conveyor or other delivery mechanism.

BACKGROUND

There are a wide variety of different types of agricultural seeding or planting machines. The machines can include row crop planters, grain drills, air seeders, or the like. These machines place seeds at a desired depth within a plurality of parallel seed trenches that are formed in the soil. Thus, these machines can carry one or more seed hoppers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. In one example, the seed metering system uses a rotating mechanism (such as a disc or a concave or bowl-shaped mechanism) that has seed receiving cells, that receive the seeds from a seed pool and move the seeds from the seed pool to the seed delivery system which delivers the seeds to the ground (or to a location below the surface of the ground, such as in a trench). The seeds can be biased into the seed cells in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that the systems do not simply rely on gravity to move the seed from the metering mechanism into the ground. Instead, such systems include a delivery mechanism that actively captures the seeds from the seed meter and physically moves the seeds from the meter to a lower opening, where the seed exits into the ground or trench.

The discussion above is merely provided for general background information and is not intended to be used as an aid in determining the scope of the claimed subject matter.

SUMMARY

An agricultural planting machine includes a seed meter configured to meter seed, a transport mechanism configured to transport the seed to a discharge location, and a loader assembly. The loader assembly includes an element having an actuating surface, a hub configured to rotate relative to the actuating surface, and a compartment supported on the hub and configured to receive the seed from the seed meter and to eject the seed into the transport mechanism. The compartment includes first and second movable elements that are movably coupled to the hub and configured to engage the actuating surface and move relative to the hub based on rotation of the hub relative to the actuating surface.

In one example, the actuating surface includes one or more grooves, and the movable element is rotated, relative to the hub, based on engagement with the one or more grooves. In one example, the actuating surface includes a cam track, and the movable element includes a cam follower. In one example, the transport mechanism includes an assistive transport mechanism. In one example, the assistive transport mechanism includes a belted conveyor. In one example, the belted conveyor includes a brush belt. In one example, the belted conveyor is configured to rotate along a first plane, and the hub is configured to rotate along a second plane that is substantially perpendicular to the first plane. In one example, the seed meter includes a rotating element configured to meter seeds from a seed pool. In one example, the rotating element includes a rotating disc having a plurality of seed apertures configured to receive seeds from a seed hopper. In one example, the rotating element is configured to rotate about a first axis and the hub is configured to rotate about a second axis that is oriented in a plane that is substantially perpendicular to the first axis. In one example, the seed meter includes a first meter and the hub includes a first hub. A second meter is configured to meter granular material. The loader assembly includes a second hub and a second compartment supported on the second hub. The second hub is configured to load the granular material into the transport mechanism. In one example, the granular material includes at least one of fertilizer or seed. In one example, the movable element is configured to move from a first position where the movable element engages seed from the seed meter and a second position that ejects the seed into the transport mechanism. In one example, the movable element includes a first movable element. The compartment is at least partially formed by the first movable element and a second movable element that is movably coupled to the hub and engages the actuating surface.

An agricultural planting machine includes a seed meter configured to meter seed and a belted conveyor including a belt mounted on a rotatable element configured to rotate about a first axis. The belted conveyor is configured to transport the seed to a discharge location. The agricultural planting machine has a loader assembly that includes a hub configured to rotate about a second axis in a plane that is substantially perpendicular to the first axis, and a compartment supported on the hub and configured to load the seed from the seed meter into the transport mechanism. The compartment includes a movable element that is movably coupled to the hub and configured to eject the seed from the compartment into the transport mechanism.

In one example, the loader assembly includes an element having an actuating surface. The movable element is rotated, relative to the hub, based on engagement with the actuating surface. In one example, the movable element is configured to move from a first position where the movable element engages seed from the seed meter and a second position that ejects the seed into the transport mechanism.

An agricultural planting machine includes a first meter configured to rotate about a first meter axis and meter first granular material, a second meter configured to rotate about a second meter axis and meter second granular material, a transport mechanism configured to transport the first and second granular materials to a discharge location, and a loader assembly. The loader assembly includes a first hub configured to rotate about a first hub axis in a plane that is substantially perpendicular to the first meter axis. A first compartment is supported on the first hub and configured to load the first granular material into the transport mechanism. The first compartment includes a first movable element that is movably coupled to the first hub and configured to eject the seed from the first compartment into the transport mechanism. The loader assembly includes a second hub configured to rotate about a second hub axis in a plane that is substantially perpendicular to the second meter axis. A second compartment is supported on the second hub and is configured to load the second granular material into the transport mechanism. The second compartment includes a second movable element that is movably coupled to the second hub and configured to eject the seed from the second compartment into the transport mechanism.

In one example, the loader assembly includes an element disposed between the first hub and the second hub. Each of the first and second hubs is configured to rotate relative to the element. The first movable element engages a first actuating surface of the element and moves relative to the first hub based on rotation of the first hub relative to the first actuating surface. The second movable element engages a second actuating surface of the element and moves relative to the second hub based on rotation of the second hub relative to the second actuating surface. In one example, each granular material of the first granular material and the second granular material includes one of seed or fertilizer.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
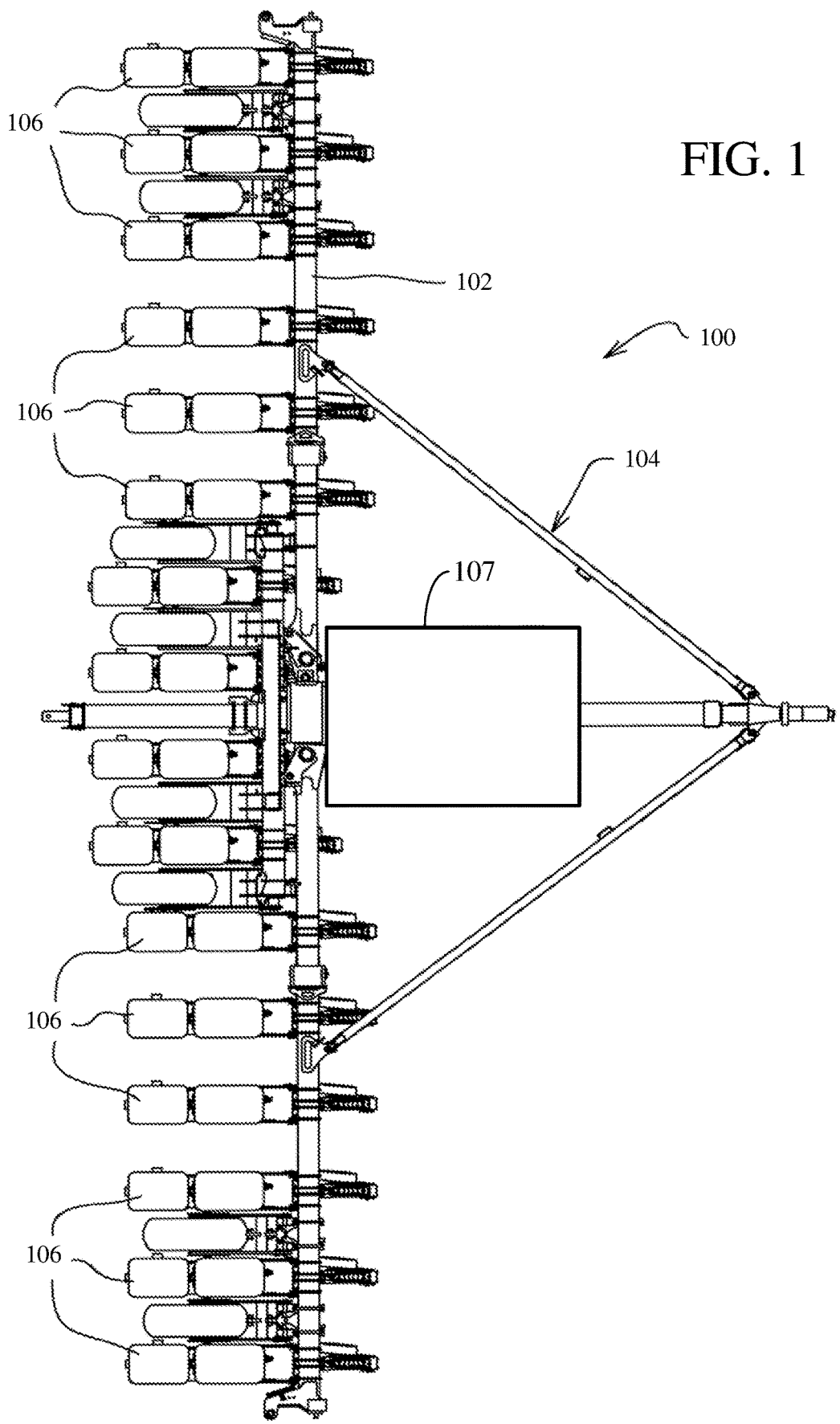
FIG. 1 shows one example of a top view of an agricultural machine.

The present description generally relates to planting or seeding equipment. An example agricultural planting machine includes a seeding system that meters seeds from a source (e.g., a hopper) and delivers the seeds to a furrow or trench formed in the ground. The metering system operates to control the rate at which seeds are metered, to achieve a desired planting rate and/or seed spacing.

For example, in operation a seed meter is designed to utilize a differential air pressure to retain seeds in a singular fashion within receiving cells. As the seed meter rotates, the individual seeds are transferred in an ordered manner In some applications, the seed meter rotates at a rate that is proportional to ground speed, or otherwise determined, to achieve a desired spacing in the ground. Deviations in seed spacing (i.e., from a desired or optimal spacing) can be caused by a number of factors, such as variations in air pressure and seed sizes or shapes, presence of foreign materials, perturbations and vibrations caused by movement over rough terrain, or other conditions. Such deviations can decrease yield potential as the seed will not be delivered to the furrow at the desired spacing, and will subsequently fail to produce a plant and eventually a crop.

Some seeding systems utilize a seed loader, such as a loading wheel, to load or transfer the metered seeds from the seed meter to a seed delivery system having a belted conveyer (or other assistive delivery or transport mechanism) that moves the metered seeds to the ground in a controlled manner Some seed loaders are configured to drop the seed at a distance away from the belted conveyer, which can result in inaccurate seed placement, or, in some instances, a failed placement if the seed is not received within the belted conveyer (or seeds are placed in the belted conveyer in an inconsistent manner). For example, a seed dropped from a seed loader can bounce off the bristles of a brush belt and fail to be retained therein. In other instances, seeds are loaded in the brush belt at varying depths, which can adversely affect the discharge consistence and timing, and therefore the seed spacing in the furrow. Further, some such seed loaders do not allow for controlled, high precision blending of different particulate materials, such as different seed varieties (e.g., multiple varieties of the same crop type, or different crop types) or coordinated delivery of fertilizer between seed placements.

The present disclosure provides a loader assembly for a belted conveyor or other delivery mechanism. The loader assembly is configured to load seed from a seed meter into the belted conveyor using a compartment supported on a rotatable hub. The compartment comprises a movable member that is movably coupled to the hub and is configured to eject the seed from the compartment through a movement of the movable element. Movement of the movable element is caused by the rotation of the hub relative to a stationary or fixed plate that engages the movable element. The movable element is configured to load the seed into the belted conveyor at a desired depth, regardless of seed side or shape, by pushing or otherwise assisting the seed into the belted conveyor (e.g., into the bristles of a brush belt). This increases the consistency of seed loading in the belted conveyor. Further, in some examples, multiple hubs are configured to convey different granular material, such as different seed varieties or combinations of seed and fertilizer, from multiple meters and load the granular material into the belted conveyor at desired spacings. This facilitates blending of different particular materials in a controlled manner.

FIG. 1 is a top view of one example of an agricultural machine 100, such as a row crop planter. Agricultural machine 100 can be towed behind another machine, such as a tractor.

Agricultural machine 100 illustratively includes a toolbar 102 that is part of a frame 104. A plurality of row units 106 are mounted to the toolbar. One or more storage tanks 107

(for sake of illustration only, one storage tank 107 is shown in FIG. 1) are configured to hold a material or commodity, such as seed or fertilizer (or other granular product) to be distributed to the soil. A storage tank can include hoppers, bins, boxes, containers, etc.

In one example, machine 100 includes a plurality of seed storage tanks that each hold product that is delivered (e.g., pneumatically) to a hopper on each row unit 106. For instance, each seed storage tank can be used to storage the same variety of seeds, or a different variety of seeds. For example, a first storage tank can contain a first variety of seeds and a second storage tank can contain a second variety of seeds or a fertilizer. The varieties can include varieties of the same crop (e.g., different varieties of corn, different varieties of soy, etc.), with each variety having different traits which facilitates increased variety to be planted at a given location in a field. The traits can include tolerances of seed to disease, draught, moisture, pests, and other seed characteristics, etc. In another example, the varieties can include different crop types (e.g., a first storage tank stores corn, a second storage tank stores soy, a third storage tank stores a more moisture tolerant variety of corn or soy, etc.). Thus, each row unit 106 can be coupled to the storage tanks through conduits such that each row unit 106 receives the varieties of seed.

Some parts of row unit 106 will now be discussed in more detail. First, it will be noted that there are different types of seed metering systems, and the one that is shown is for the sake of example only and is described in greater detail below. The seed metering system can include finger pick-up discs and/or vacuum meters (e.g., having rotatable discs, rotatable concave, or bowl-shaped devices), among others. The seed metering system is configured to meter seeds to a seed delivery system, which conveys the seeds into a seed trench. Example seed delivery systems include a gravity drop system (such as a seed tube) in which seeds are dropped through the seed tube and fall (via gravitational force) through the seed tube and out an outlet end into the seed trench. Other types of seed delivery systems can be or can include assistive systems, in that the systems do not simply rely on gravity to move the seed from the metering system into the ground. Instead, such assistive seed delivery systems actively assist the seeds in moving from the meter to a lower opening, where the seeds exit and are deposited into the ground or trench. Assistive seed delivery systems can physically capture the seed and move the seed from the meter to the outlet end of the seed delivery system. Some assistive seed delivery systems include belted conveyers. One example of a belted conveyer includes a brush belt having a brush that is formed of distally extending bristles that are carried on an endless, rotating belt and configured to trap, hold, and release the metered seeds. Seed movement through the seed delivery system is controlled. Other examples of belted conveyors include a flighted belt in which a set of paddles form individual chambers (or receivers), a pocketed belt with resilient fingers, a foam belt, to name a few.

Figure 2:
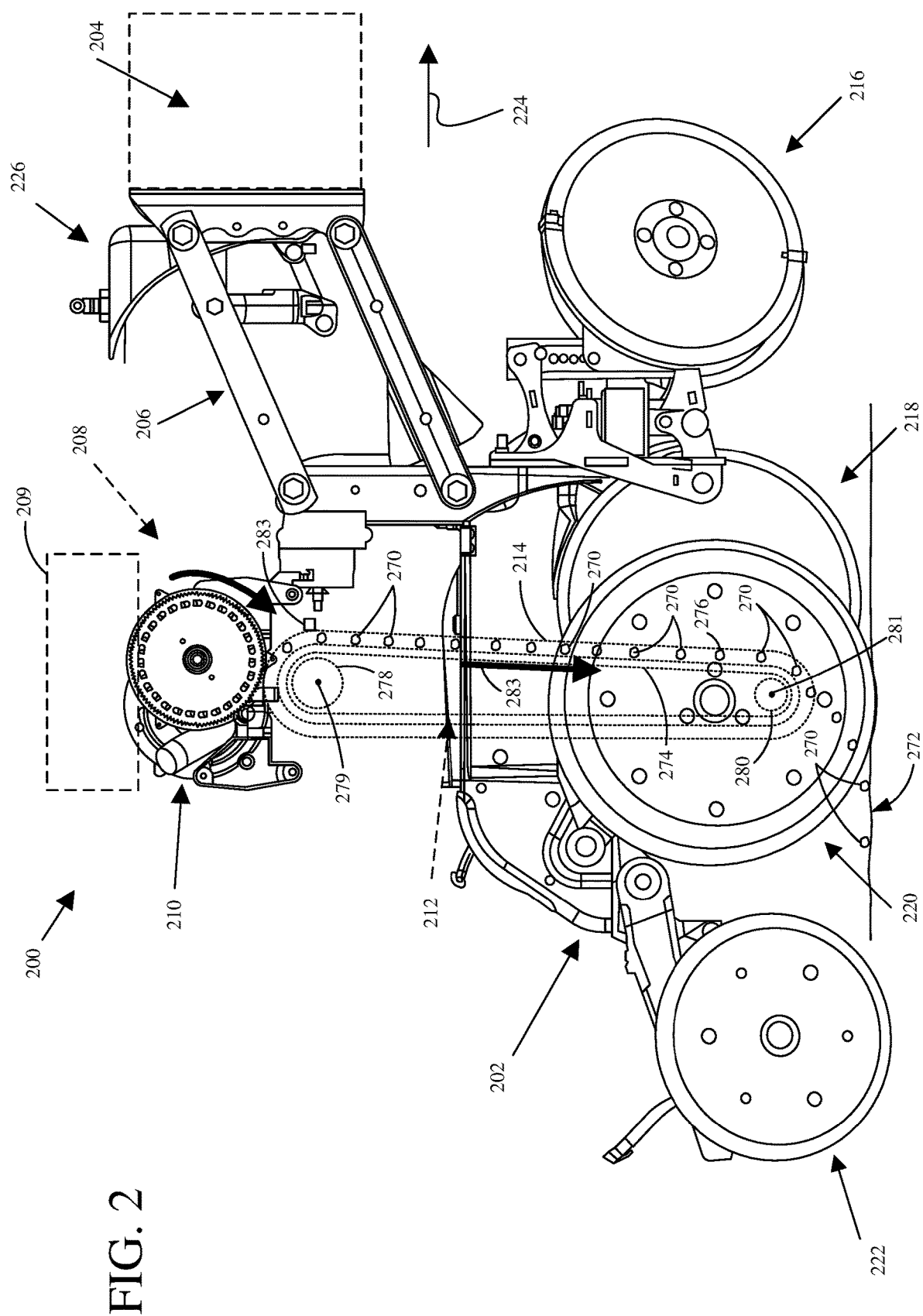
FIG. 2 shows one example of a side view of a row unit of the agricultural machine shown in FIG. 1.

FIG. 2 is a side view showing one example of a row unit 200 (e.g., row unit 106). Row unit 200 includes a frame 202 illustratively connected to a toolbar (generally shown at 204) by a linkage (generally shown at 206). Linkage 206 is illustratively mounted to toolbar 204 so that frame 202 can move upwardly and downwardly (relative to toolbar 204).

Row unit 200 includes a seeding system 208 having one or more seed hoppers (generally represented at dashed box 209), a seed metering system 210, and a seed delivery system 212. Each seed hopper 209 stores seed (or other granular material such as fertilizer, or combinations of seed and fertilizer). The seed is provided from hopper(s) 209 to seed metering system 210 that meters the seed and provides the metered seed to seed delivery system 212 that captures the seed and delivers the seed to the final resting location (e.g., furrow or trench generated by the row unit) using an assistive seed delivery or transport mechanism 214. In the present example, mechanism 214 includes a belted conveyor, such as but not limited to, an endless brush belt (also referred to as conveyor 214).

Row unit 200 can also include a row cleaner 216, a furrow opener 218, a set of gauge wheels 220, and a set of closing wheels 222. As noted above, row unit 200 can also include additional hopper(s) that can be used to provide additional material, such as a fertilizer or other chemical.

In operation, as row unit 200 moves in the direction generally indicated by arrow 224, row cleaner 216 generally cleans the row ahead of opener 218 to remove plant debris from the previous growing season and opener 218 opens a furrow in the soil. Gauge wheel(s) 220 illustratively control a depth of the furrow and seed is metered by seed metering system 210 and delivered to the furrow by seed delivery system 212. Closing wheel(s) 222 close the trench over the seed. A downforce generator 226 can also be provided to controllably exert downforce to keep the row unit in desired engagement with the soil.

Figure 3:
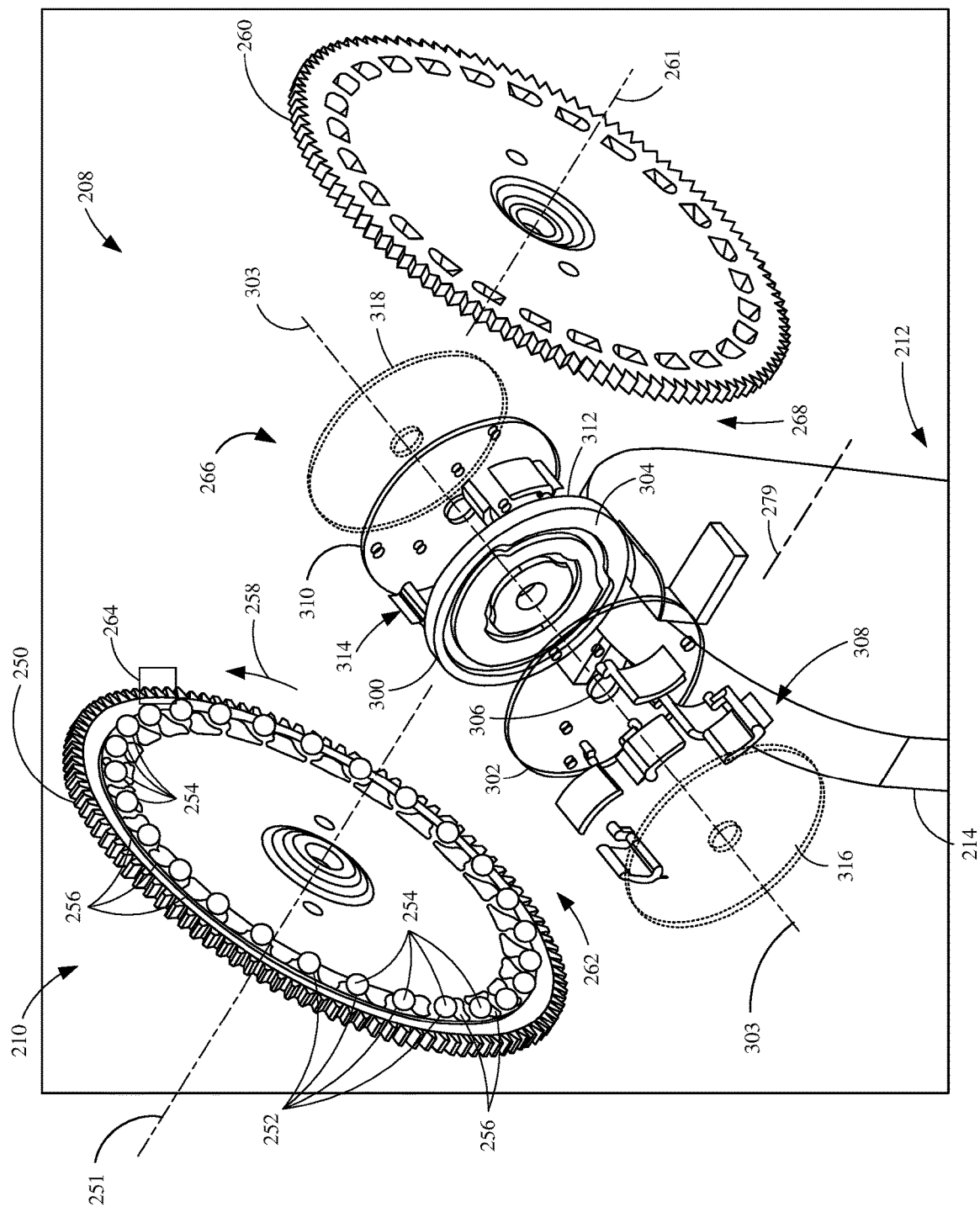
FIG. 3 is an exploded perspective view of a seeding system, in one example.

FIG. 3 is an exploded perspective view of a portion of seeding system 208. As illustrated, seed metering system 210 includes one or more seed metering disks. While, in the described example below, seed metering system 210 includes dual metering disks, it is noted that in another example a single metering disk can be utilized.

Seed metering disk 250 comprises a rotatable element, such as a disc or concave element. Seed metering disk 250 has a cover (not shown in FIG. 3) and is rotatably mounted relative to frame 202 (not shown in FIG. 3). Seed metering disk 250 is rotatably driven by a motor (not shown in FIG. 3) and has a plurality of seed-retaining elements or cells in the form of seed apertures 252 configured to retain seeds 254. A plurality of projections or tabs 256 are closely proximate corresponding seed apertures 252. A seed pool is disposed generally in a lower portion of an enclosure formed by seed metering disk 250 and the corresponding cover. Seed metering disk 250 is rotatably driven (such as by an electric motor, a pneumatic motor, a hydraulic motor, etc.) for rotation generally in the direction indicated by arrow 258, about a shaft or other driving element.

A pressure differential is introduced into the interior of the enclosure so that the pressure differential influences seeds from the seed pool to be drawn to seed apertures 252. For instance, a vacuum can be applied to draw the seeds from the seed pool so that the seeds come to rest in apertures seed 252, where the vacuum holds them in place. Alternatively, a positive pressure can be introduced into the interior of the metering mechanism to create a pressure differential across seed apertures 252 to perform a similar function.

Seed metering system 210 includes a second seed metering disk 260 that is similar to seed metering disk 250 and is configured to meter a different granular material, such as a different variety of seeds, fertilizer, or other granular material, from a second hopper.

Once a seed comes to rest in (or proximate) a particular seed aperture 252, the vacuum or positive pressure differential acts to hold the seed within the seed aperture 252 such that the seed is carried generally in the direction indicated by arrow 258, from the seed pool, to a discharge area (generally represented at reference numeral 262). Also, a seed presence sensor (generally represented by block 264) can be mounted adjacent to seed metering disk 250 and configured to detect the presence of seed in individual seed apertures.

When the seeds reach the seed discharge area 262, a loader assembly 266 that is configured to engage the seeds, removes the seeds from seed metering disk 250, and convey the seeds to seed delivery system 212, where the seeds are loaded into belted conveyor 214 (a brush belt in the present example). Similarly, seeds (or other granular material) conveyed by seed metering disk 260 to a respective discharge area 268 are also loaded by loader assembly 266 into belted conveyor 214.

In one example, when a particular seed aperture 252 carrying a seed 254 reaches discharge area 262, the seed 254 is removed from the particular seed aperture 252 in any of a number of ways. For example, the vacuum or other pressure differential can be removed from the particular seed aperture 252 to encourage seed removal from the particular seed aperture 252 and subsequent capture by loader assembly 266 to load that seed into seed delivery system 212. In another example, a loader wheel operates to reduce or remove the pressure differential and mechanically push the seed 254 out of the particular seed aperture 252, such as by rolling a finger element into the particular seed aperture 252 from the back surface of the disk.

As discussed in further detail below, loader assembly 266 comprises a dual-sided assembly configured to load granular material from a plurality of seed metering disks (i.e., disks 250 and 260). The rotation of each of seed metering disk 250, seed metering disk 260, and loader assembly 266 can be independently controlled to obtain a desired spacing of the granular material in belted conveyor 214. Briefly (with reference to FIG. 2), loader assembly 266 loads granular material 270 into belted conveyor 214 at a particular spacing to achieve a desired distance between the granular material in furrow 272. Granular material 270, in one example, includes the seeds 254 metered from seed metering disk 250. Alternatively, or in addition, granular material 270 can include multiple different types or varieties of seeds and/or fertilizer metered from metering disk 260.

For example, granular material 270 can include a single variety of seed from metering disk 250. In another example, granular material 270 can include multiple different varieties of seed metered, respectively, from seed metering disks 250 and 260. The different varieties of seed can be interleaved or metered at different times (e.g., not interleaved). In another example, granular material 270 can include both seed and fertilizer metered, respectively, from seed metering disks 250 and 260. The seed and fertilizer can be interleaved or metered at different times (e.g., not interleaved). These, of course, are for sake of example only.

Conveyor 214 includes a belt 274 with a brush 276 that is formed of distally extending bristles attached to belt 274. Belt 274 is mounted about a first rotatable element (a first pulley in the present example) 278 configured to rotate about a first axis 279 and a second rotatable element (a second pulley in the present example) 280 configured to rotated about a second axis 281. One of elements 278 and 280 is illustratively a drive pulley while the other is illustratively an idler pulley. The drive pulley is rotatably driven by a conveyance motor (not shown in FIG. 2) which can be an electric motor, a pneumatic motor, a hydraulic motor, etc. Belt 274 is generally driven in the direction indicated by arrow 282. Therefore, when particular material 270 is loaded by loader assembly 266, the particular material is positioned within the bristles by movement of a movable element in loader assembly 266. This is discussed in further detail below. Briefly, however, a compartment in loader assembly 266 that conveys the seed through loader assembly 266 actuates or moves as the compartment nears the discharge location and applies pressure to the seed to push the seed into brush 276 at a desired depth. This facilitates uniform loading of a wide variety of material (seed, fertilizer, etc.) types, sizes, and geometries. Seed delivery system 212 can also include a seed presence detector 283 configured to detect the presence of seed at the sensor location.

Referring again to FIG. 3, loader assembly 266 includes a plate 300 that is mounted at a stationary position relative to frame 202. A rotatable hub 302 is positioned on a first side 304 of plate 300, and is rotatable relative to plate 300. For example, hub 302 can be mounted on a shaft passing through aperture 306 that is driven by a motor. In one example, rotation of hub 302 is based on rotation of seed metering disk 250. In another example, hub 302 is rotatable independent of seed metering disk 250. Accordingly, seed metering disk 250 and hub 302 can be rotatably driven by the same motor or different motors. Further, in one example, rotation of hub 302 is proportional to the rotation of seed metering disk 250. For instance, a particular gear ratio is established between seed metering disk 250 and hub 302 can be utilized such that hub 302 rotates at a particular speed relative to disk 250.

Loader assembly 266 comprises a plurality of dynamically adjusting compartments formed by a set of members or elements 308. Each compartment is configured to engage and retain a seed 254 from seed metering disk 250, and convey the seed 254 to seed delivery system 212 through rotation of hub 302. In the illustrated example, each compartment is formed by a pair of elements 308, where one or more of the elements forming the compartment is pivotably coupled to hub 302, and is automatically actuated based on rotation of hub 302 relative to plate 300. This is discussed in further detail below.

In the illustrated example, loader assembly 266 includes a second hub 310 mounted on a second, opposing side 312 of plate 300, and includes a set of elements 314. Hub 310 and elements 314 are illustratively similar to hub 302 and elements 308, respectively. Each hub 302 or 310 can include a respective cover 316 or 318 that engages the corresponding elements 308 or 314 and encloses the compartments to retain the seeds therein (i.e., prevent the seeds from falling out of the compartments).

Seed metering disk 250 is configured to rotate about an axis 251, metering disk 260 is configured to rotate about an axis 261, and hubs 302 and 310 are configured to rotate about an axis 303. Axes 251 and 261 are substantially parallel (e.g., less than ten degrees) to one another, and each of hubs 302 and 310 are oriented along a plane that is substantially parallel to axes 251 and 261. Also, axes 251 and 261 are substantially parallel to the axis 279 of rotation of the rotatable element 278 of conveyor 214. Further, axis 303 lies in a plane that is substantially perpendicular (e.g., within ten degrees of ninety degrees) to axis 251. Also, the plane of axis 303 is substantially perpendicular to axis 261. Therefore, in one example, axis 303 is generally orthogonal to, but offset from, axes 251 and 261.

Figure 4:
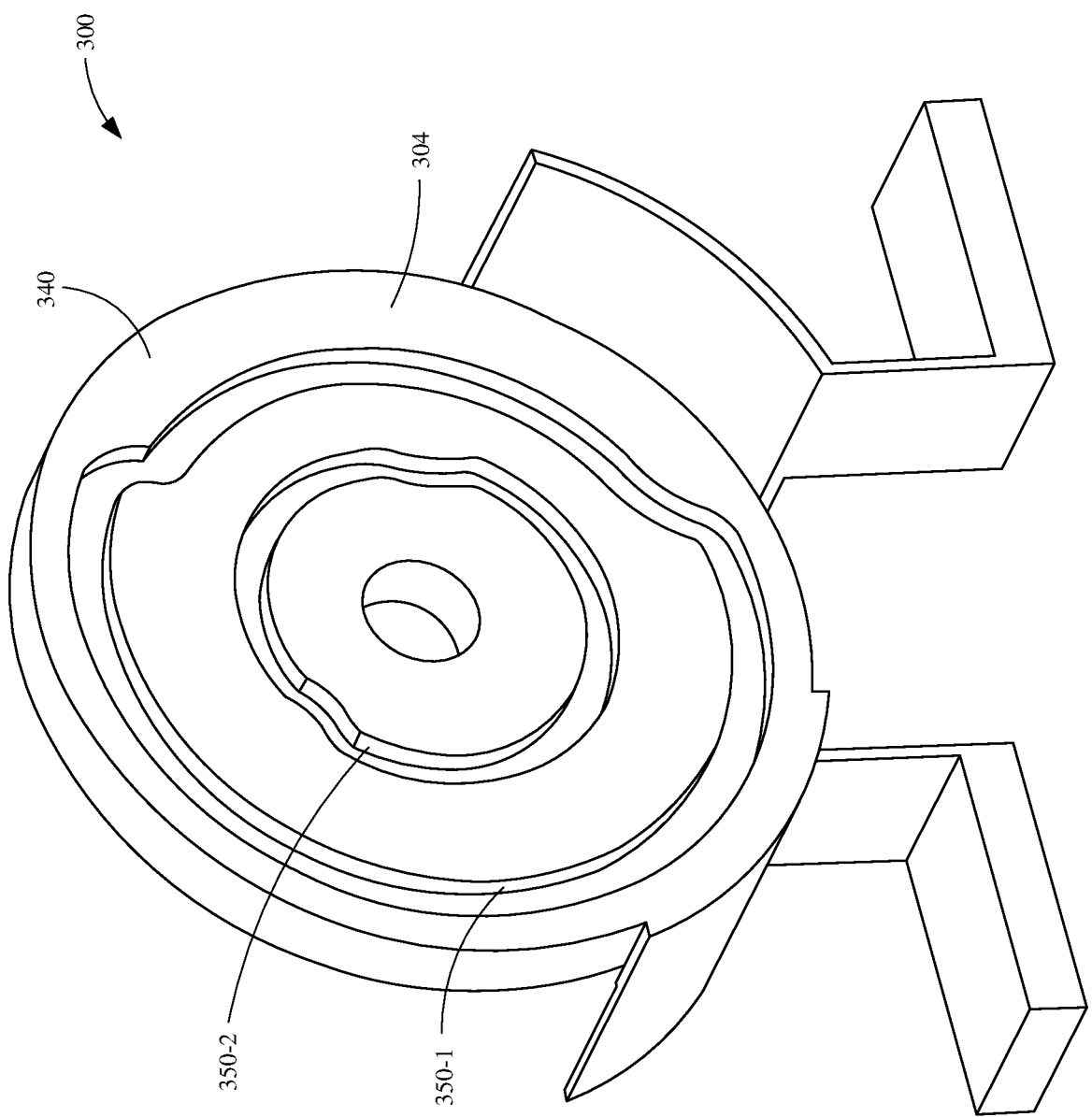
FIG. 4 illustrates one example of a plate for a loader assembly.

FIG. 4 illustrates one example of plate 300. Side 304 of plate 300 comprises an actuating surface 340 configured to actuate the compartments on loader assembly 266. In the illustrated example actuating surface 340 includes a grooved surface having one or more grooves 350-1, 350-2 (collectively referred to as grooves 350) formed therein. Actuating surface 340 illustratively forms a face cam having cam tracks that receive portions of elements 308 and are configured to cause movement of elements 308 as hub 302 rotates relative to plate 300. The opposing side 312 of plate 300 includes an actuating surface similar to surface 340.

Figure 5:
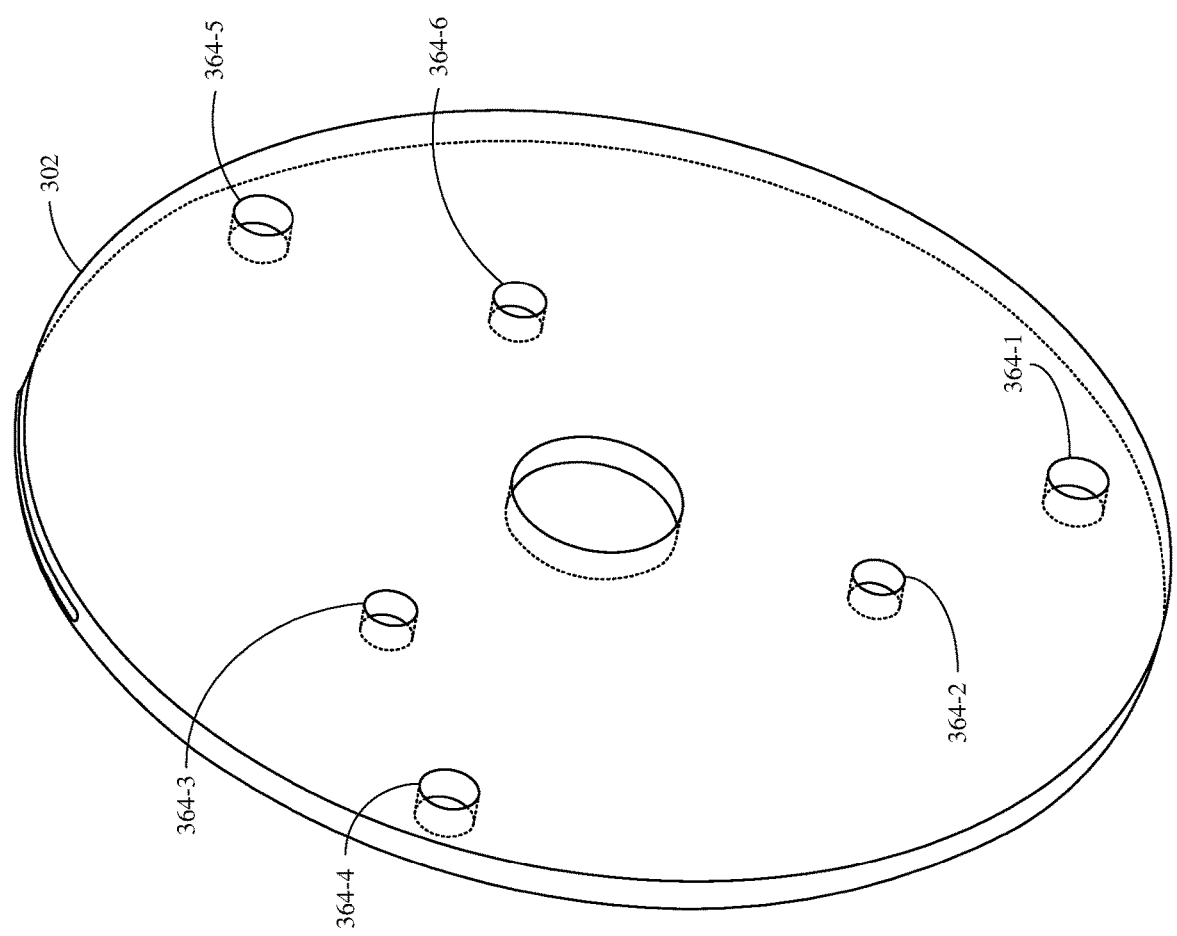
FIG. 5 illustrates one example of a hub for a loader assembly.
Figure 6:
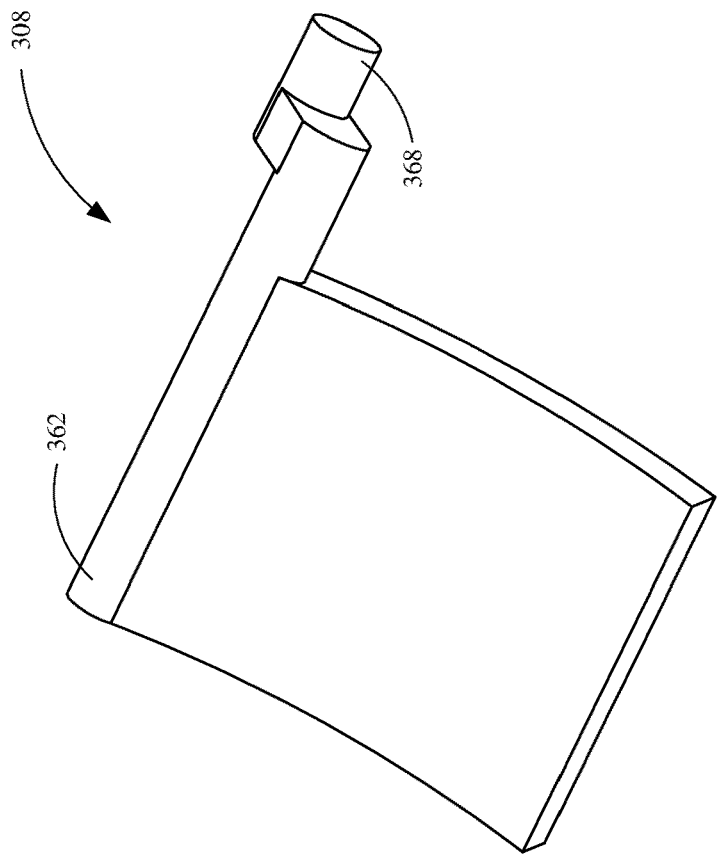
FIG. 6 illustrates one example of movable elements for a loader assembly.
Figure 6:
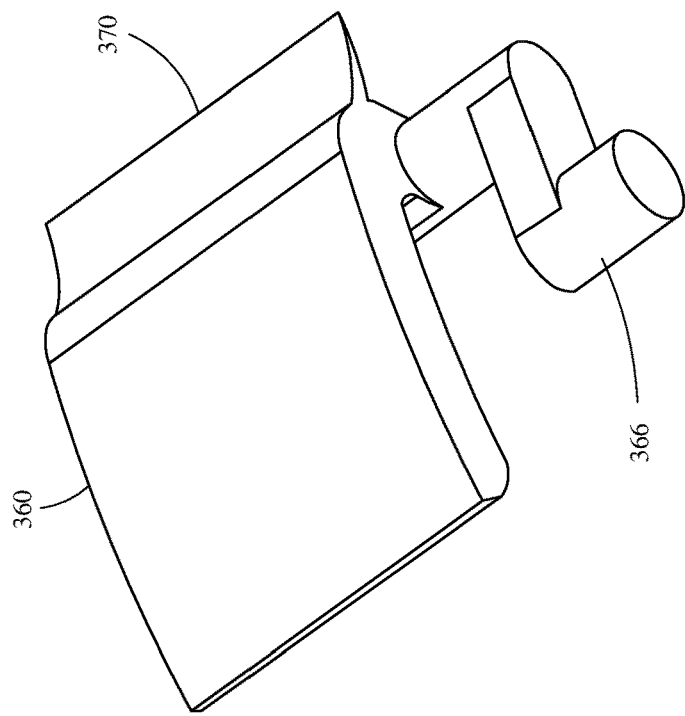

FIG. 5 illustrates one example of hub 302 and FIG. 6 illustrates examples of elements 308 that form the compartments carried on hub 302. In the illustrated example, each compartment is formed by a first element 360 and a second element 362 that are pivotably coupled within adjacent pairs of apertures 364-1, 364-2, 364-3, 364-4, 364-5, or 364-6 (collectively referred to apertures 364).

For sake of illustration, each element 360 and 362 is rotatably received within a corresponding aperture 364. Element 360 comprises a cylindrical tab 366 that extends through aperture 364-1 and is received within groove 350-1 of plate 300. Similarly, element 362 comprises a cylindrical tab 368 that extends through aperture 364-2 and is received within groove 350-2. Tabs 366 and 368 form, in the illustrated example, cam follower elements that follow the cam tracks formed by grooves 350-1 and 350-2. The orientation and shape of grooves 350-1 and 350-2 cause movement of tabs 366 and 368, thereby causing corresponding rotation of elements 360 and 362 relative to hub 302. This is described in further detail below with respect to FIGS. 7-14.

Element 360 comprises a scraper portion 370 that is configured to engage a seed carried on seed metering disk 250, thereby dislodging the seed from the corresponding aperture 252. The dislodged seed is carried within the compartment formed between elements 360 and 362. As the compartment reaches or nears the discharge area, one or more of elements 360 and 362 are actuated by movement of tabs 366, 368 within grooves 350 thereby rotating the member(s) in a direction that pushes the seed out of the compartment and into the seed delivery system 212.

In one example, cover 316 includes one or more clearance notches that allow seeds to enter loader assembly 266. Also, an additional cover plate can be provided between elements 308 and plate 300, and configured to protect grooves 350 and support elements 308.

FIGS. 7-14 illustrate an example operation of loader assembly 266. In FIGS. 7-14, hub 302 is illustratively transparent, such that actuating surface 340 of plate 300 can be seen, for sake of discussion.

Loader assembly 266 is positioned between metering disks 250 and 260, and hub 302 rotates about axis 303 that lies along a plane that is substantially perpendicular to axes 251 and 261. Loader assembly 266 is positioned in the seed path between belted conveyer 214 and metering disks 250 and 260.

Elements 308 form a set of compartments 400, 402, and 404. Each compartment 400, 402, and 404 is formed by a pair of movable elements, that are pivotably supported on hub 302 and engage the actuating surface 340 of plate 300. In the present example, compartment 400 comprises a first finger or paddle element 406 and a second finger or paddle element 408. It is noted that while each of elements 406 and 408 is illustrated as being pivotably supported on hub 302, in one example element 408 is positioned at a fixed, non-movable orientation (such as that shown in FIG. 10) and element 406 is pivotable to open and close (e.g., load and unload) compartment 400. Compartment 402 includes elements 410 and 412 that are similar to elements 406 and 408, and compartment 404 includes elements 414 and 416 that are similar to elements 406 and 408.

Figure 7:
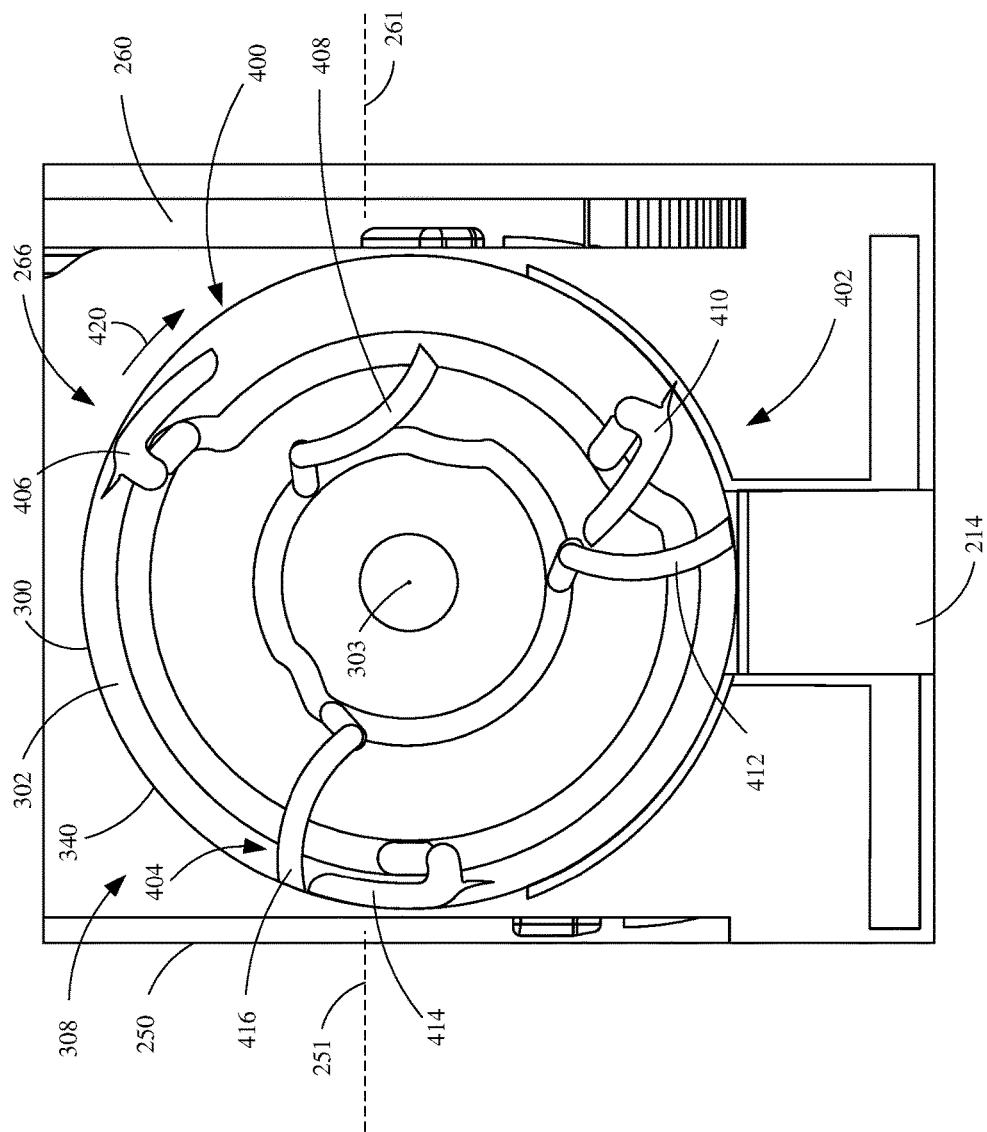
FIGS. 7-14 illustrate an example operation of a loader assembly.

At the position shown in FIG. 7, compartment 400 is in an open or loading orientation in which element 408 is pivoted away from metering disk 260 to prevent element 408 from scraping (or being near) metering disk 260, which can otherwise dislodge seed from metering disk 260 before compartment 400 is in position to receive the seed.

Figure 9:
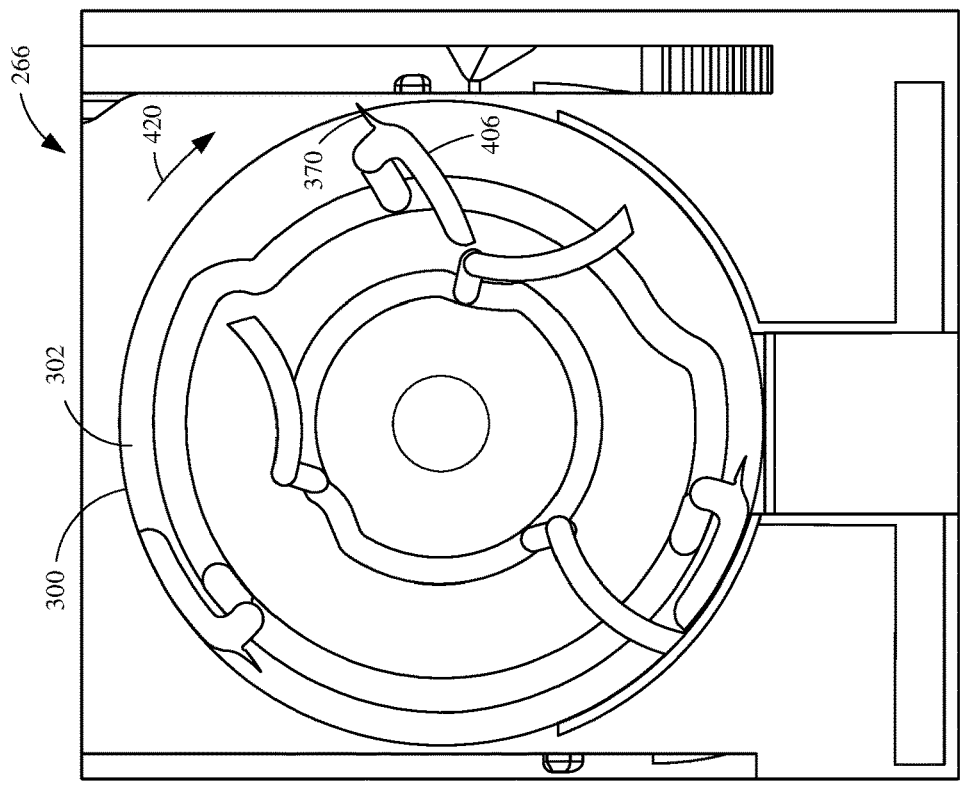
Figure 8:
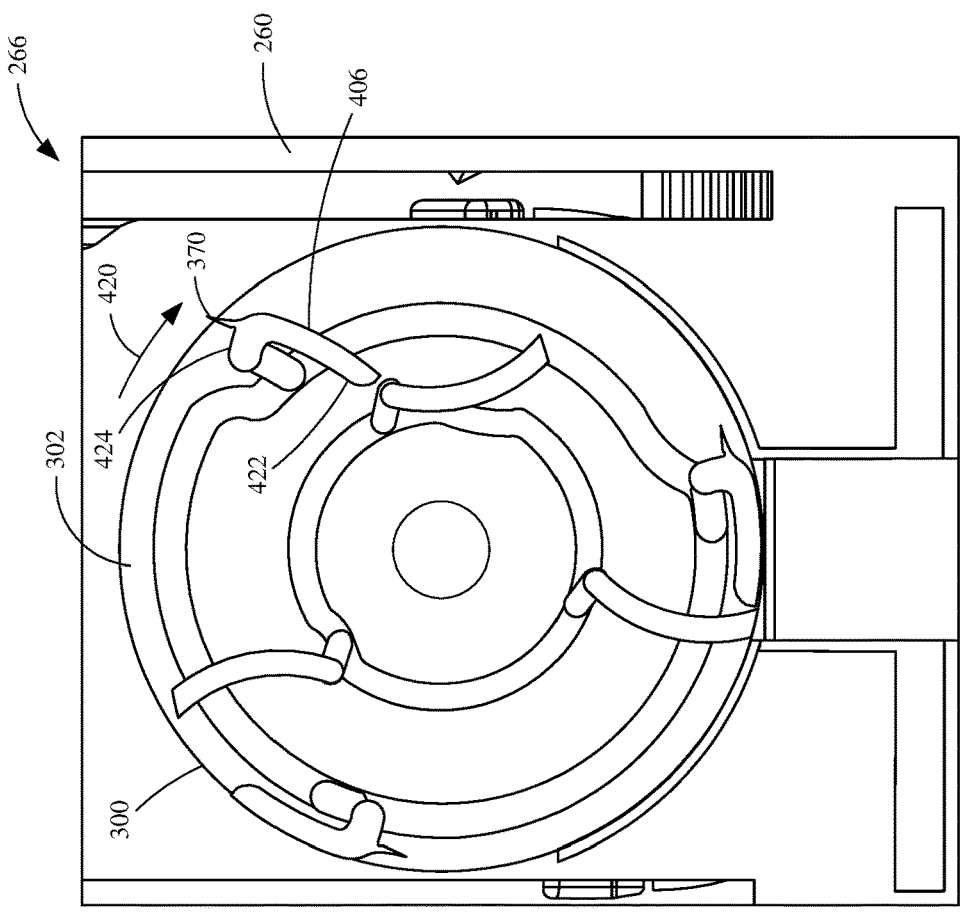

Hub 302 rotates in direction 420 to the position shown in FIG. 8. The engagement of element 406 with the actuating surface (e.g., a cam track) of plate 300 causes element 406 to pivot, moving a first end 422 away from metering disk 260 and a second end 424 (having scraper portion 370) towards metering disk 260. Continued rotation of hub 302 in direction 420 causes element 406 to be further rotated by plate 300 toward a closed position, which is illustrated in FIG. 9.

Figure 11:
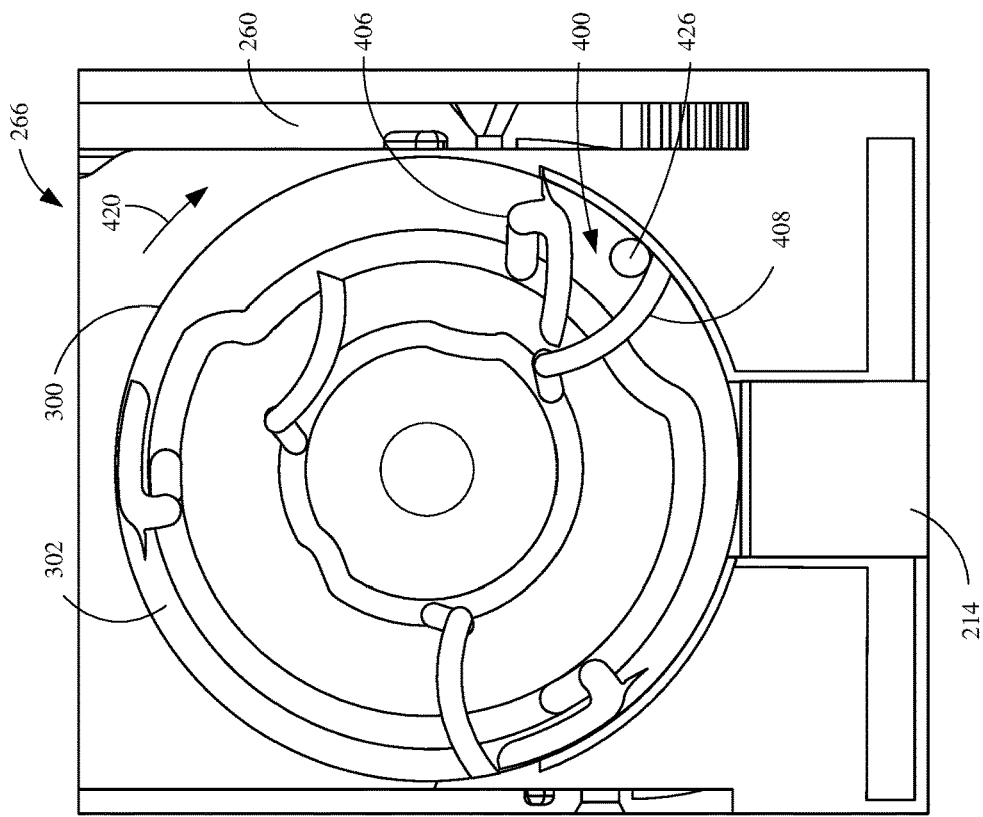
Figure 10:
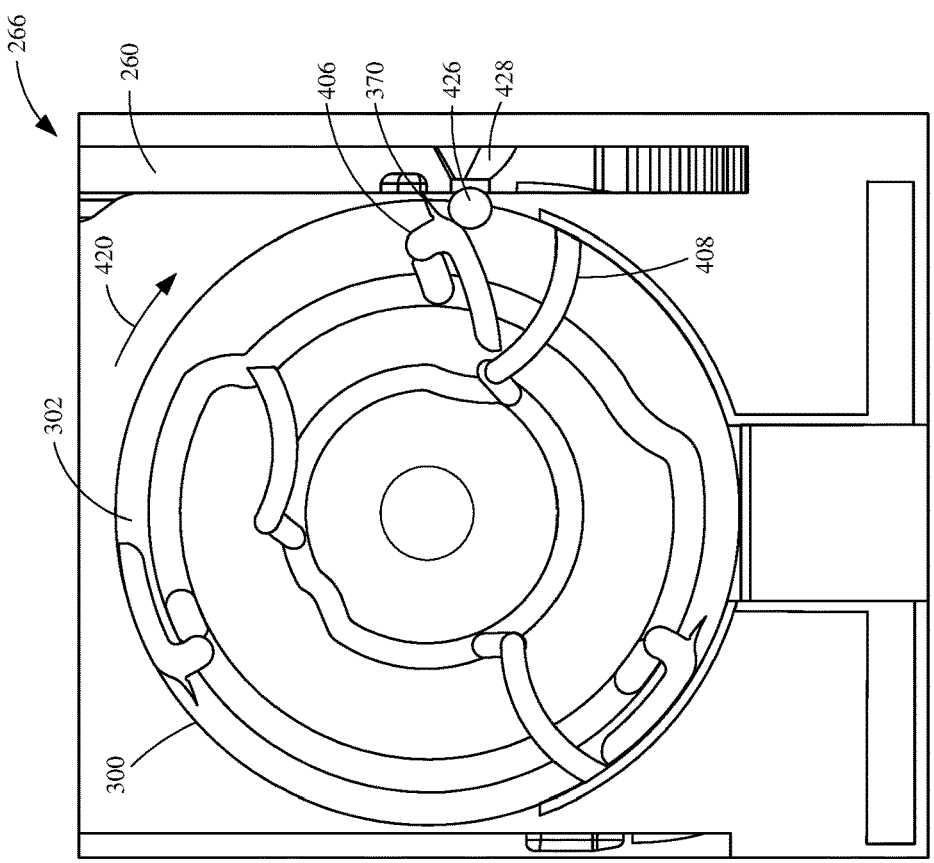

As shown in FIG. 10, hub 302 is further rotated in direction 420 and both elements 406 and 408 are in a closed position and scraper portion 370 is configured to engage a seed 426 carried on a seed aperture 428 of metering disk 260. As shown in FIG. 11, hub 302 continues to rotate in direction 420 and the seed 426 is dislodged from metering disk 260 and is carried in the closed compartment 400 formed between element 406, element 408, hub 302, and cover 316 (shown in FIG. 3). The closed compartment 400 prevents seed 426 from rolling in an uncontrolled manner toward belted conveyor 214. Hub 302 conveys seed 426 within compartment 400 toward belted conveyor 214 in a controlled manner.

Figure 13:
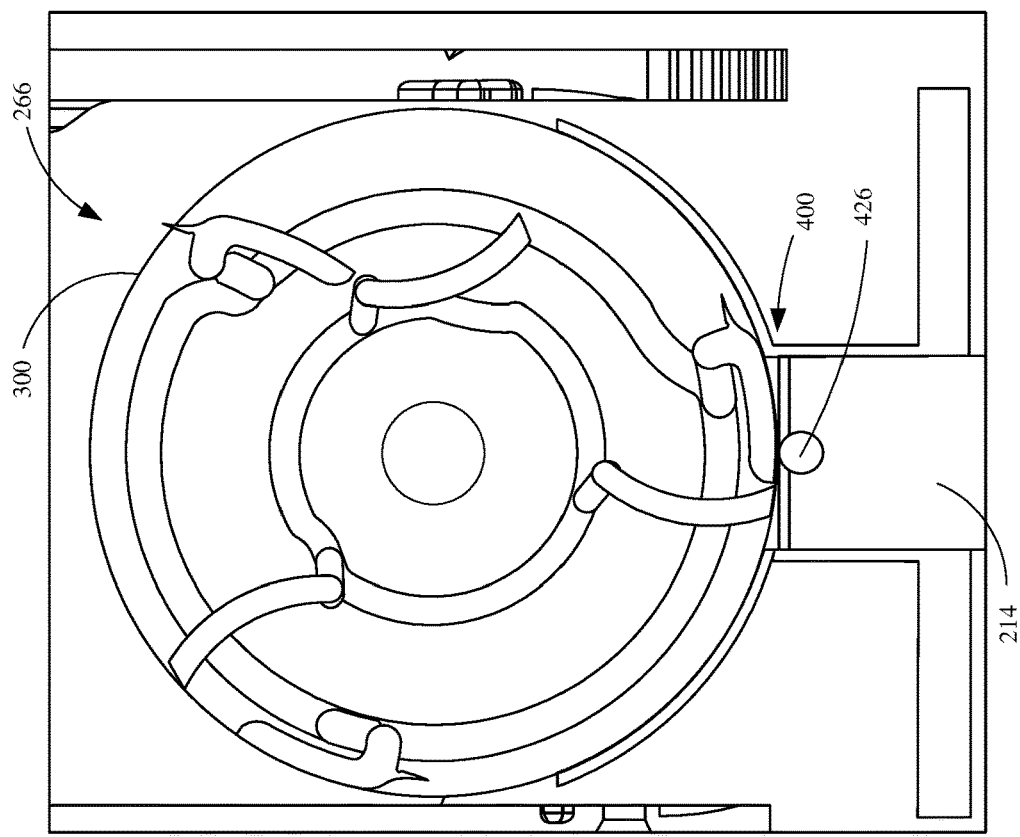
Figure 12:
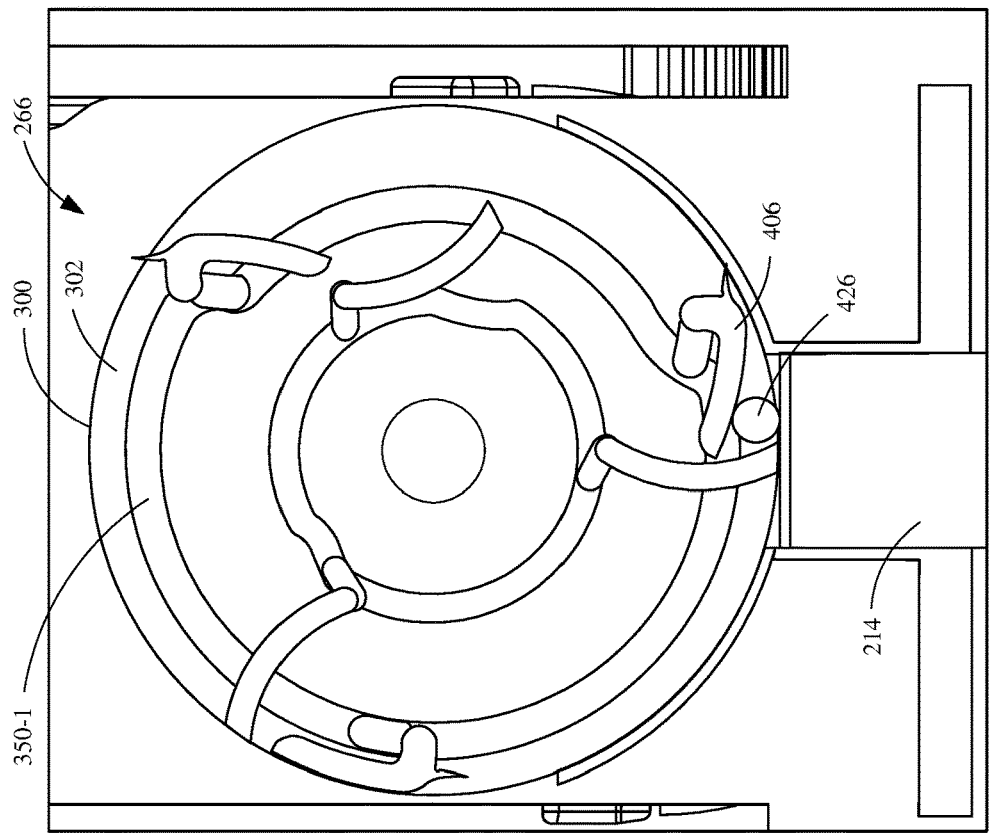
Figure 14:
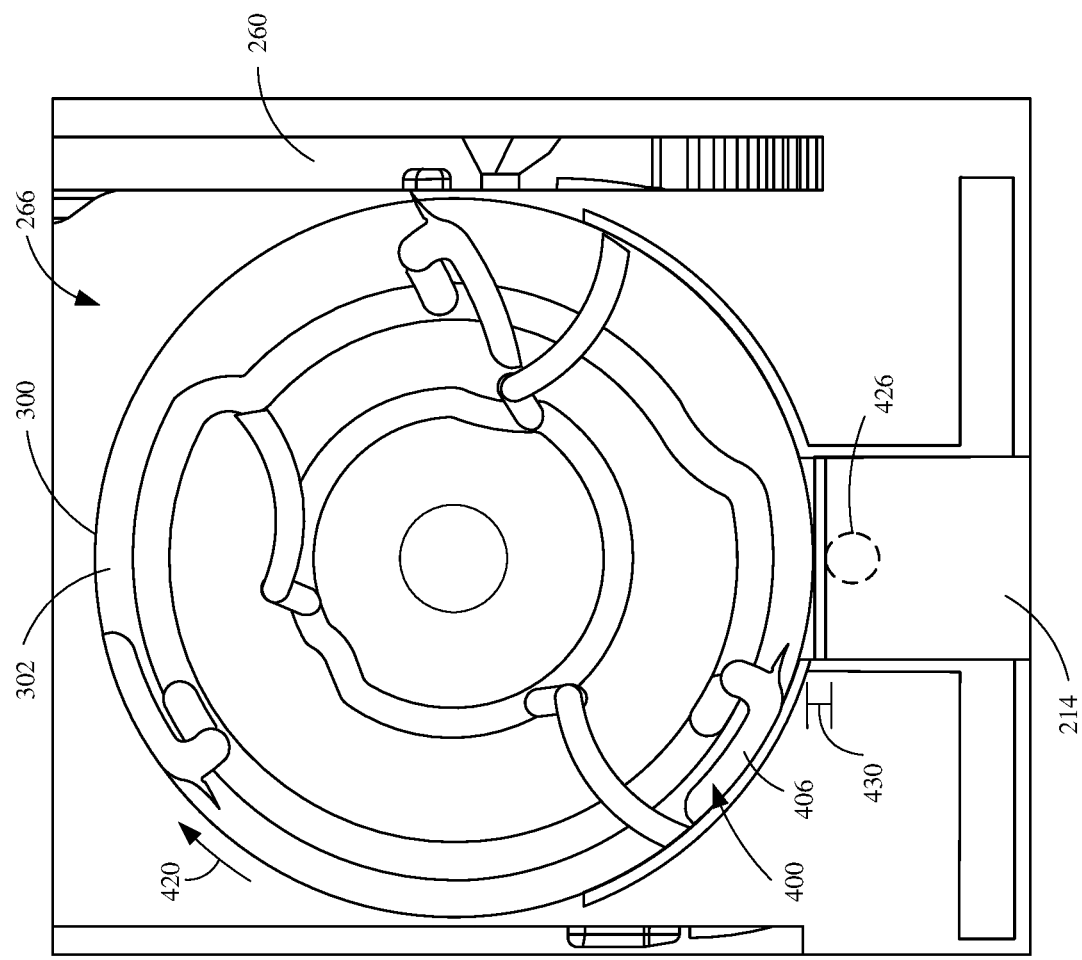

As shown in FIG. 12, further rotation of hub 302 moves element 406 along the groove 350-1, causing rotation of element 406 (counterclockwise in FIG. 12) such that end 422 moves towards belted conveyor 214 thereby pushing seed 426 toward and into belted conveyor 214. FIG. 13 illustrates seed 426 ejected from compartment 400, into belted conveyor 214. As shown in FIG. 14, seed 426 is deposited at a depth 430 in belted conveyor 214 based on the force applied by element 406 as seed 426 is being released. Hub 302 continues to rotate in direction 420 causing compartment 400 to rotate toward the position shown in FIG. 7, in which compartment 400 begins a return to the open configuration, to load another seed from metering disk 260.

It is noted that the illustrations shown in FIGS. 7-14 describe operation of hub 302. In one example, hub 310 on an opposing side of plate 300 is configured to operate in a similar manner to load seeds 252 (or other granular material such as fertilizer) from metering disk 250. The granular material from metering disks 250 and 260 can be selectively loaded into belted conveyor 214 by controlling one or more of seed metering disks 250, 260 or loader assembly 266. For example, rotation of metering disks 250 and/or 260 can be controlled to determine when seeds are loaded into loader assembly 266, and into seed delivery system 212. Alternatively, or in addition, hubs 302 and 310 can be controlled (together or independent of one another) to control when seeds retrieved from the corresponding metering disks 250, 260 are loaded into seed delivery system 212.

Figure 15:
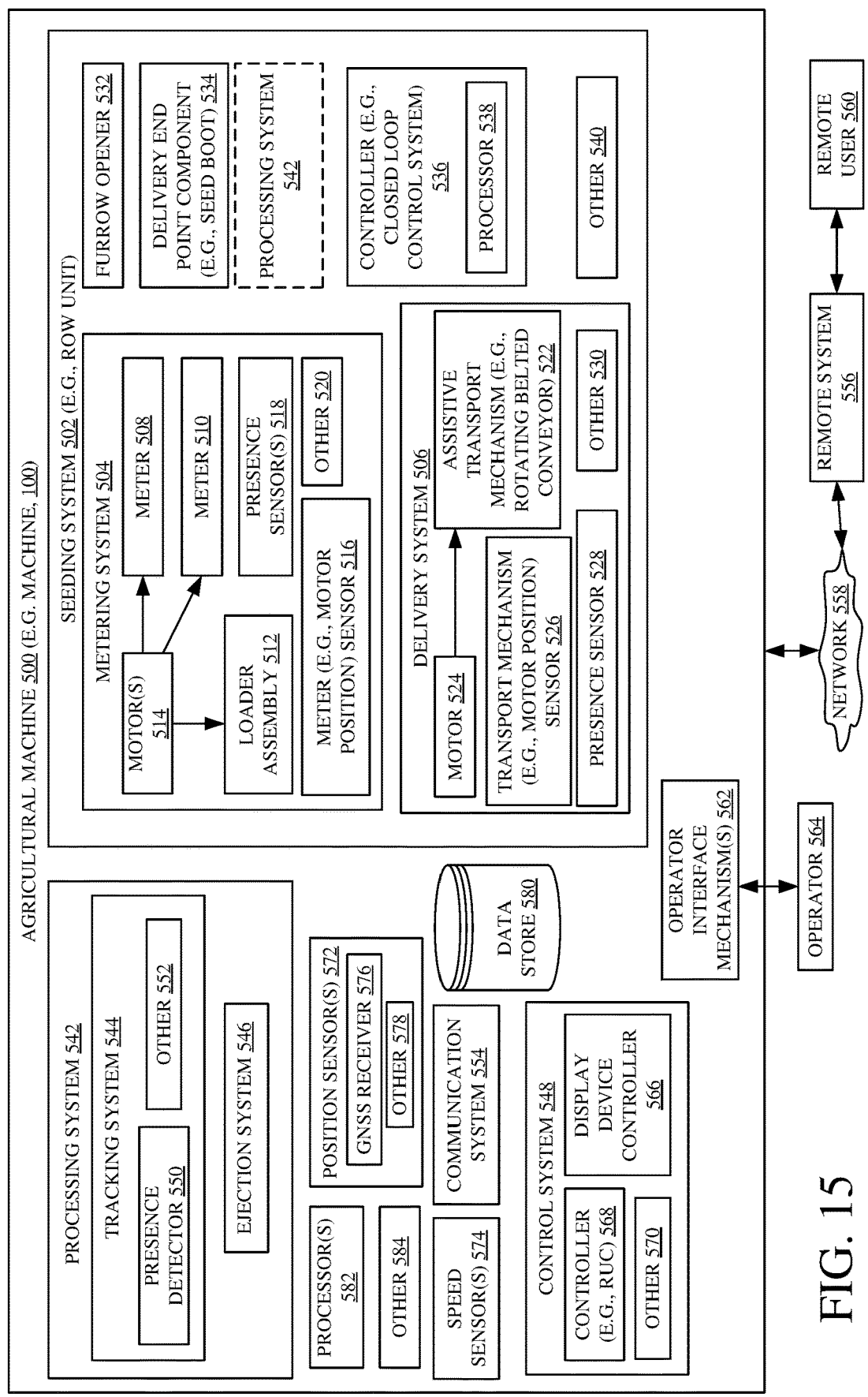
FIG. 15 is a simplified block diagram of one example of an agricultural machine architecture.

FIG. 15 shows a block diagram of one example of an agricultural machine architecture that includes an agricultural machine 500 having a seeding system 502. One example of machine 500 is, or includes, machine 100 illustrated in FIG. 1 having seeding system 208. Accordingly, each row unit can have a metering system 504 (e.g., system 210) and a delivery system 506 (e.g., system 212) disposed thereon or otherwise associated with the row unit.

Metering system 504 includes a first meter 508 (e.g., metering disk 250), a second meter 510 (e.g., metering disk 260), and a loader assembly 512 (e.g., assembly 266) that are driven by one or more motors 514. It is noted that one or more of meter 508, meter 510, and loader assembly 512 can be driven by a separately controlled motor, or meter 508, meter 510, and loader assembly 512 can be controlled by a same motor through a gear assembly at a selected gear ratio, for example. In any case, meter 508 is controlled to meter or otherwise singulate first granular material, such as a first variety of seed, from a first source and meter 510 is controlled to meter or otherwise singulate second granular material, such as a second variety of seed or fertilizer, from a second source. For sake of the following discussion, but not by limitation, metering system 504 will be described in the context of metering multiple varieties of seeds to delivery system 506.

Metering system 504 can include a meter sensor 516 configured to sense characteristics of metering system 504 and to generate a sensor signal indicative of a position of meter 508 and/or meter 510. For example, sensor 516 can directly sense meter 508 and/or sensor 516 can sense motor 514 (or other component that drives meter 508), such as a speed and/or position of motor 514 (e.g., an angular position of a motor output shaft). For instance, sensor 516 can include, but is not limited to, an angle encoder, a Hall Effect sensor, an optical sensor, or any of a wide variety of other sensors that generate a signal indicative of angular position. One or more presence sensors 518 (e.g., sensor 264) can also be provided to sense the presence of granular material (i.e., seed in the present example) in one or more of meter 508 and meter 510. Presence sensor 518 will also referred to as seed sensor 518. Metering system 504 can include other items 520 as well.

Delivery system 506 includes an assistive transport mechanism 522 driven by a motor 524. One example of transport mechanism 522 includes belted conveyor 214 illustrated above with respect to FIG. 3. Delivery system 506 can also include a transport mechanism sensor 526 configured to sense characteristics of delivery system 506 and to generate a sensor signal indicative of a position of an assistive transport mechanism 522. For example, sensor 526 can directly sense mechanism 522 and/or sensor 526 can sense a motor 524 that drives mechanism 522. It is noted that while separate motors 514 and 524 are illustrated in FIG. 15, in another example only one motor can be used to drive both metering system 504 and delivery system 506.

A presence sensor 528 (e.g., sensor 283) is positioned along the transport route to detect the presence of seeds at the sensor location. Sensor 528 is configured to generate and send a sensor signal indicative of the sensed presence. As used herein, a sensor signal includes both analog signals and digital signals, such as communications using a controller area network (CAN) bus. Delivery system 506 can include other items 530 as well.

In one example, sensor 518 (and/or sensor 528) includes an optical or reflective sensor and thus includes a transmitter component and a receiver component. In another example, sensor 518 (and/or sensor 528) includes a mechanical sensor that senses the presence, or sensor 518 can be another type of sensor that senses the presence of the seed. In addition to sending an indication (e.g., a sensor signal) indicative of the presence of seed, sensors 518 and/or 528 (or another sensor) can be configured to sense a characteristic of the seed, such as, but not limited to, a size, shape, color or other characteristic (such as an indication that the seed is cracked or otherwise irregular).

Seeding system 502 (e.g., on a particular row unit) can also include a furrow opener 532 configured to form a furrow or trench in the ground, a delivery endpoint component 534 configured to deliver the seed into the furrow, and a controller 536. In one example, controller 536 provides a closed loop control system and can include a processor 538. Of course, seeding system 502 can include other items 540 as well.

Agricultural machine 500 includes a processing system 542 having a tracking system 544 configured to track seed (or other granular material) movement within seeding system 502 and a seed ejection system 546 configured to control, or to generate control signals that are used by a control system 548 to control ejection of the seeds from component 534. It is noted that while processing system 542 is broken out separately in FIG. 15, some or all of the tracking and ejection control functions can be performed by seeding system 502. The illustration in FIG. 15 is for sake of example only.

Tracking system 544 illustratively includes a presence detector 550 configured to receive signals generated by sensor 518 (and/or sensor 528), and determine whether a seed is present. Tracking system 544 is configured to track movement of seed (or other particular material) through seeding system 502 based on the signals from sensors 516, 518, 526, and/or 528. Tracking system 544 can include other items 552 as well.

Ejection system 546 is configured to determine a target speed and position for motors 514 and/or 524 for releasing the seed at a target position in the furrow. This can be based on, for example, a target planting map.

Control system 548 is configured to control one (or both) of metering system 504 and delivery system 506 to place seeds at desired locations based on the speed of agricultural machine 500 and the position and/or speed of the respective system being controlled, when seed is detected and when the seed is to be released.

In the example illustrated in FIG. 15, control system 548 is configured to control other components and systems of machine 500. For instance, control system 548 generates control signals to control communication system 554 to communicate between components of machine 500 and/or with other systems, such as remote system 556 over a network 558. Network 558 can be any of a wide variety of different types of networks, such as the Internet, a cellular network, a local area network, a near field communication network, or any of a wide variety of other networks or combinations of networks or communication systems.

In the illustrated example, a remote user 560 is shown interacting with remote system 556. Remote system 556 can be a wide variety of different types of systems. For example, remote system 556 can be a remote server environment used by remote user 560. Further, system 556 can include a mobile device, remote network, or a wide variety of other remote systems. Remote system 556 can include one or more processors or servers, a data store, and can include other items as well.

Communication system 554 can include wireless communication logic, which can be substantially any wireless communication system that can be used by the systems and components of machine 500 to communicate information to other items, such as between seeding system 502, processing system 542, and/or control system 548. In one example, communication system 554 communicates over a CAN bus (or another network, such as an Ethernet network, etc.) to communicate information between systems 502, 542, and/or 548. This information can include the various sensor signals and output signals generated based on the sensor variables and/or sensed variables.

Control system 548 is configured to control interfaces, such as operator interface mechanisms 562 that include input mechanisms configured to receive input from an operator 564 and output mechanisms that render outputs to operator 564. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc. In one example, control system 548 includes a display device controller 566 configured to control display device(s) that provide operator interface mechanisms 562.

In the illustrated example, control system 548 includes a controller 568, and can include other items 570. Controller 568 is configured to control seeding system 502 based on processing performed by processing system 542. This control can include sending messages or other signals over any suitable communication mechanism, such as a CAN bus. Controller 568 can thus include a row unit controller (RUC) configured to control, either directly or with controller 536, the seeding system on each row unit.

It is noted that in one example seeding system 502 (e.g., on a particular row unit) includes some (or all) of the components and related functionality described with respect to processing system 542. This is represented by the dashed block in FIG. 15.

Machine 500 also includes a number of other sensors including, but not limited to, position sensor(s) 572 and speed sensor(s) 574. Position sensor(s) 572 are configured to determine a geographic position, heading, and/or route of machine 500. Position sensor 572 can include, but is not limited to, a Global Navigation Satellite System (GNSS) receiver 576 that receives signals from a GNSS satellite transmitter. Position sensor 572 can also include a Real-Time Kinematic (RTK) component that is configured to enhance the precision of position data derived from the GNSS signal from receiver 576. Illustratively, an RTK component uses measurements of the phase of the signal's carrier wave in addition to the information content of the signal to provide real-time corrections, which can provide up to centimeter-level accuracy of the position determination. Position sensor(s) 572 can include other items 578 as well.

Speed sensor(s) 574 are configured to determine a speed at which machine 500 is traversing a worksite (e.g., field or other terrain) during the planting operation. Sensor(s) 574 can sense the movement of ground engaging elements (e.g., wheels or tracks) and/or can utilize signals received from other sources, such as position sensor(s) 572.

Machine 500 also includes a data store 580, one or more processors 582, and can include other items 584. Data store 580 can store any of a wide variety of different types of information.

Figure 16:
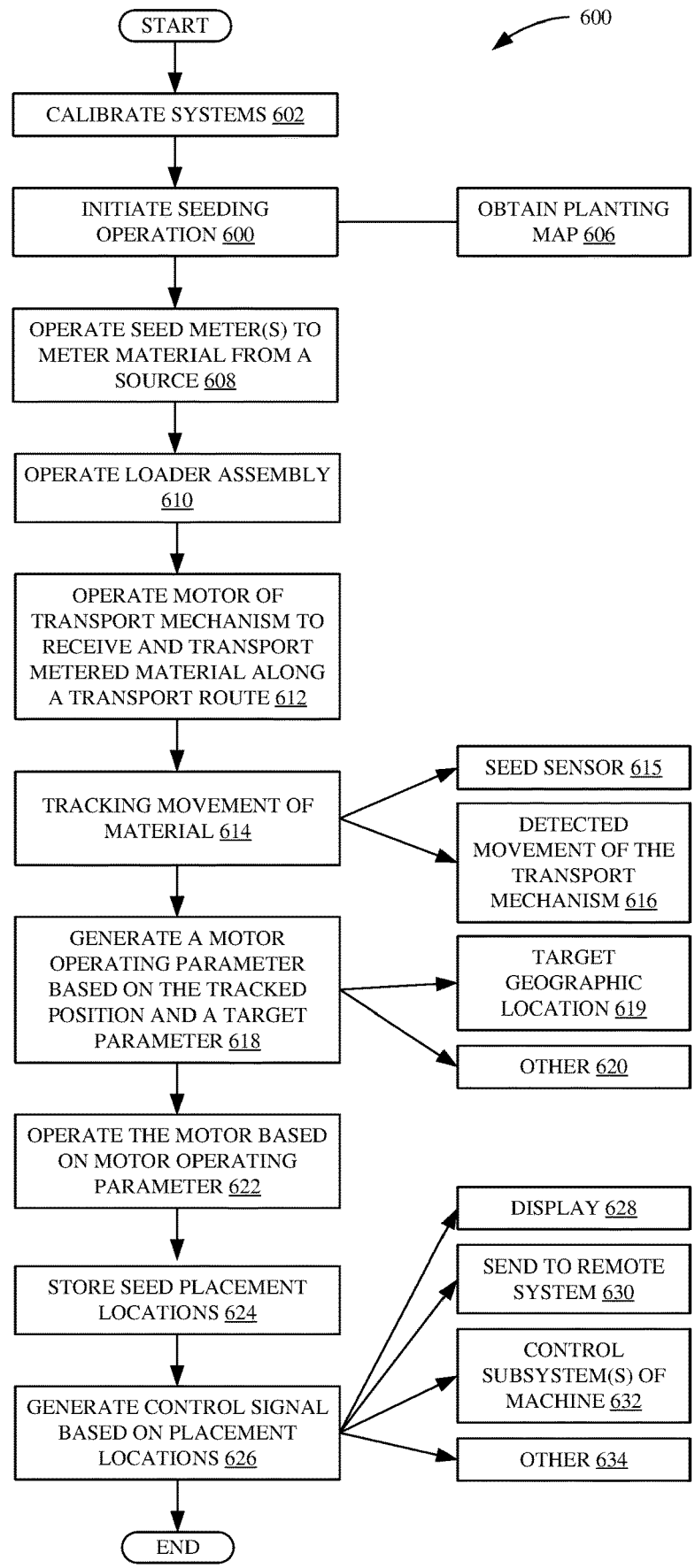
FIG. 16 is a flow diagram illustrating an example operation of an agricultural machine.

FIG. 16 is a flow diagram 600 illustrating an example operation of an agricultural machine. For sake of illustration, but not by limitation, FIG. 16 will be described in the context of agricultural machine 500 discussed with respect to FIG. 15.

At block 602, the systems of machine 500 are calibrated or otherwise configured for operation. Calibration can be done manually, automatically, or a combination of manual or automatic processes. For example, but not by limitation, a seed planting delay can be determined that represents the delay from when a seed is released from the seed delivery system to when the seed is placed in the furrow. When combined with machine speed information, this delay can be utilized to determine when a seed should be released from the seed delivery system so that the see ends up at a target location in the furrow. Block 602 can include determining a position offset of each delivery endpoint component (component 534) on each end unit. The position offset represents a difference between the position sensed by the position sensor (i.e., position sensor 572 in FIG. 15) and the particular location of endpoint component 534. The position sensor can be located on a central frame of machine 500, on a support vehicle such as a towing tractor, or otherwise. Also, an ejection time offset or delay can be determined based on characteristics of seeding system 502. An ejection time offset or delay represents an estimated time that it will take a seed that is released from transport mechanism 522 to reach the furrow.

At block 604, a seeding operation is initiated. The seeding operation can be done manually by inputs from operator 564, automatically, or otherwise.

In one example, a planting map is obtained at block 606. The planting map represents geographic locations on the field for planting. For instance, the planting map can include locations for a first variety of seed, a second variety of seed, and fertilizer. The planting map information can be input by operator 564, received from remote system 556, or determined in other ways as well.

At block 608, meter 508 and/or meter 510 are operated to meter granular material from corresponding source(s). For example, block 608 can include operating motor(s) 514 to convey seed to the discharge location at the interface with loader assembly 512. At block 610, loader assembly 512 is operated to load the granular material from meter 508 and/or meter 510 into transport mechanism 522. Again, block 610 can be based on the planting map obtained at block 606. For example, motor(s) 514 can be controlled to rotate hubs 302 and 310 to place seed and fertilizer in mechanism 214 in accordance with a sequence and spacing defined by the planting map.

At block 612, transport mechanism 522 is operated to receive and transport the metered material along the transport route to the delivery endpoint component 534.

At block 614, movement of the material through seeding system 502 is tracked, for example based on sensor signals from presence sensors 518 and/or 528. This is represented at block 615. Alternatively, or in addition, movement can be tracked based on detected movement of the meters (based on signals from meter sensor 516) and movement of transport mechanism 522 based on signals from transport mechanism sensor 526. This is represented at block 616.

At block 618, motor operating parameters are generated based on the tracked position and a target parameter for releasing the seed. For example, block 618 can be based on a target geographic location at block 619, or in other ways, which is represented at block 620. The motor operating parameter can indicate, for example, a particular motor speed and/or duration for conveying the material along the transport route.

At block 622, motors 514 and 524 are controlled based on the motor operating parameter. Seed placement locations are stored at block 624, which indicate the actual planting locations of the seed and/or fertilizer, based on the tracked movement. In one example, the seed planting locations can be stored as a planting map that represents the actual seed planting locations as, for example, a dot matrix or other suitable representation. A planting map can be utilized during a subsequent spraying operation, a subsequent harvesting operation, a planting operation in a subsequent year, etc. For example, a harvesting operation can utilize this information as estimated yield data for specific areas of the field.

At block 626, a control signal is generated based on the seed placement locations. In one example, the control signal can control a display on, or associated with, machine 500 to display the seed placement locations. This is represented by block 628. Alternatively, or in addition, the seed placement location information can be sent to remote system 556. This is represented by block 630. In another example, subsystems of machine 500 can be controlled. This is represented by block 632. Of course, control signals can be generated in other ways as well. This is represented by block 634.

It can thus be seen that the present delivery system provides a number of advantages. For example, but not by limitation, a loader assembly for a belted conveyer, or other delivery mechanism, is configured to load seeds and/or fertilizer from one or more meters into the belted conveyer in a consistent manner. The loader assembly includes movable members that automatically actuates or moves, as the loader assembly rotates relative to the meter, between positions that accepts the seeds from the meter and a closed position that conveys the seeds to the belted conveyer. Further, when at the discharge position, one or more of the movable members actuates to push the seed into the belted conveyer so consistent depth is achieved. All of this can improve the seed/fertilizer placement and spacing, which can improve yield.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. The processors, processing systems, controllers and/or servers are functional parts of the systems or devices to which the parts belong and are activated by, and facilitate the functionality of the other components or items in those systems.

Also, a number of user interface displays have been discussed. The user interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The user actuatable input mechanisms can also be actuated in a wide variety of different ways. For instance, the user actuatable input mechanisms can be actuated using a point and click device (such as a track ball or mouse). The user actuatable input mechanisms can be actuated using hardware buttons, switches, a joystick or keyboard, thumb switches or thumb pads, etc. The user actuatable input mechanisms can also be actuated using a virtual keyboard or other virtual actuators. In addition, where the screen on which the user actuatable input mechanisms are displayed is a touch sensitive screen, the user actuatable input mechanisms can be actuated using touch gestures. Also, where the device that displays them has speech recognition components, the user actuatable input mechanisms can be actuated using speech commands.

A number of data stores have also been discussed. It will be noted the data store(s) can each be broken into multiple data stores. All can be local to the systems accessing the data store(s), all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 15, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 17:
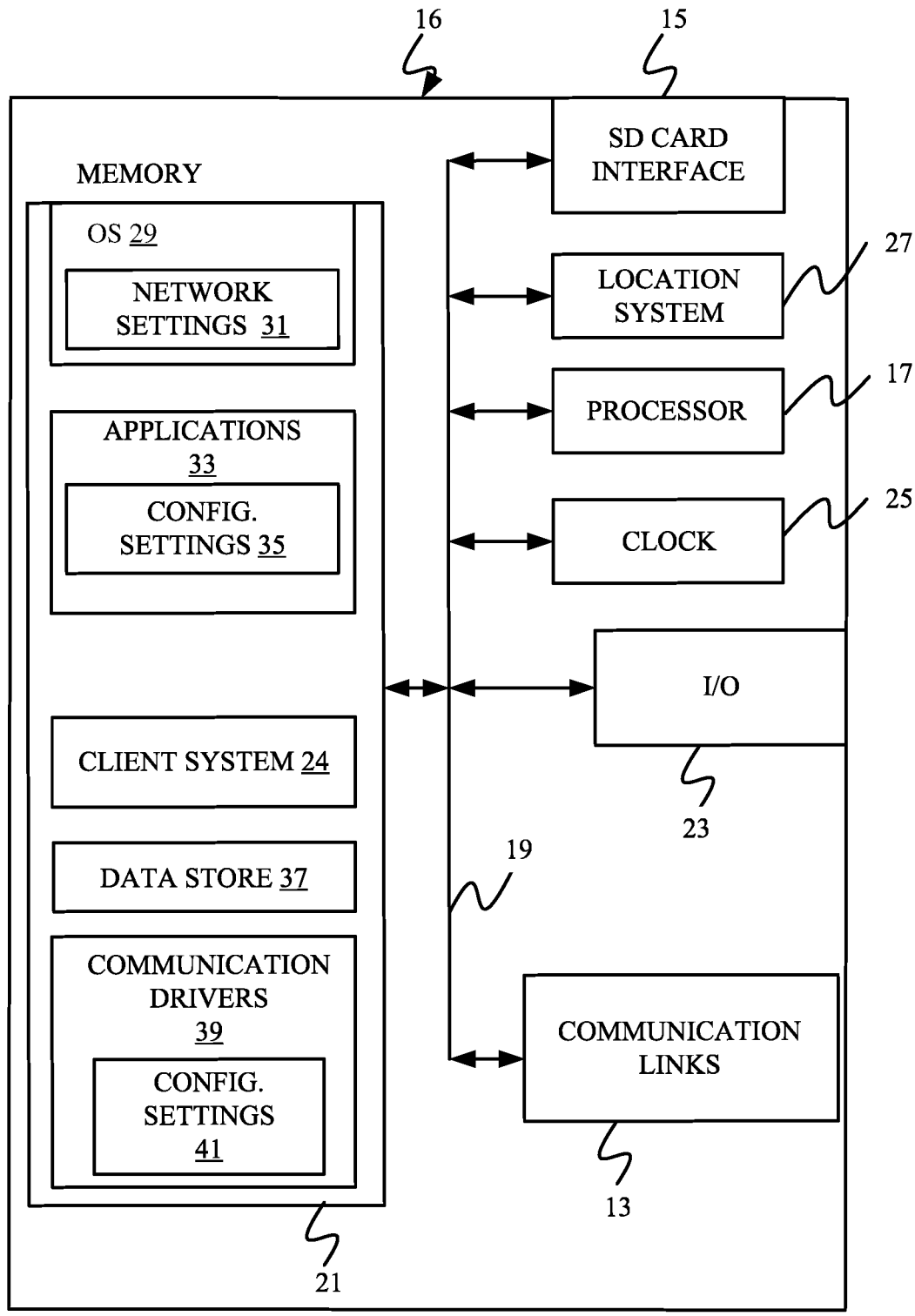
FIG. 17-19 show examples of mobile devices that can be used in the architectures shown in the previous figures.
Figure 18:
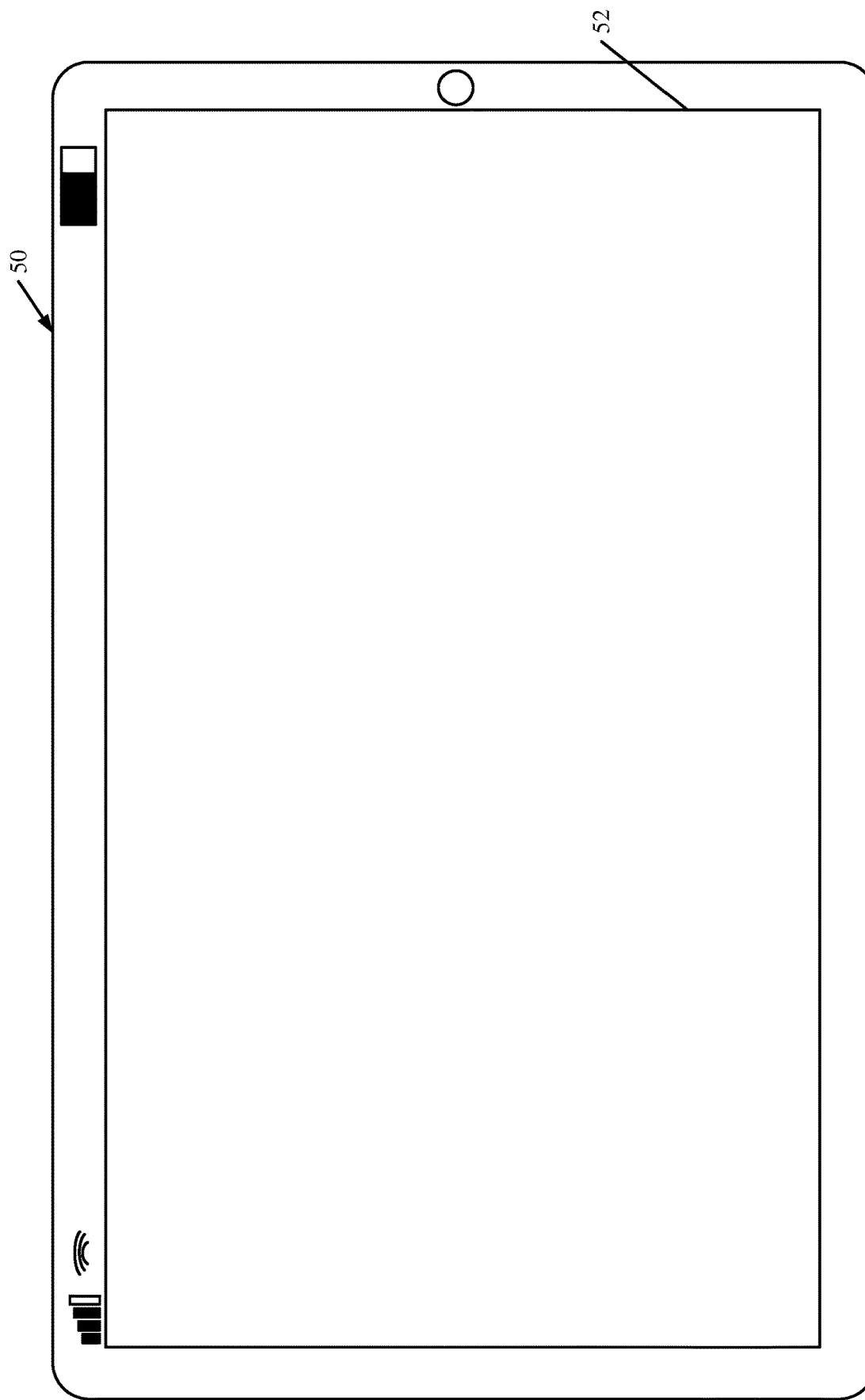
Figure 19:
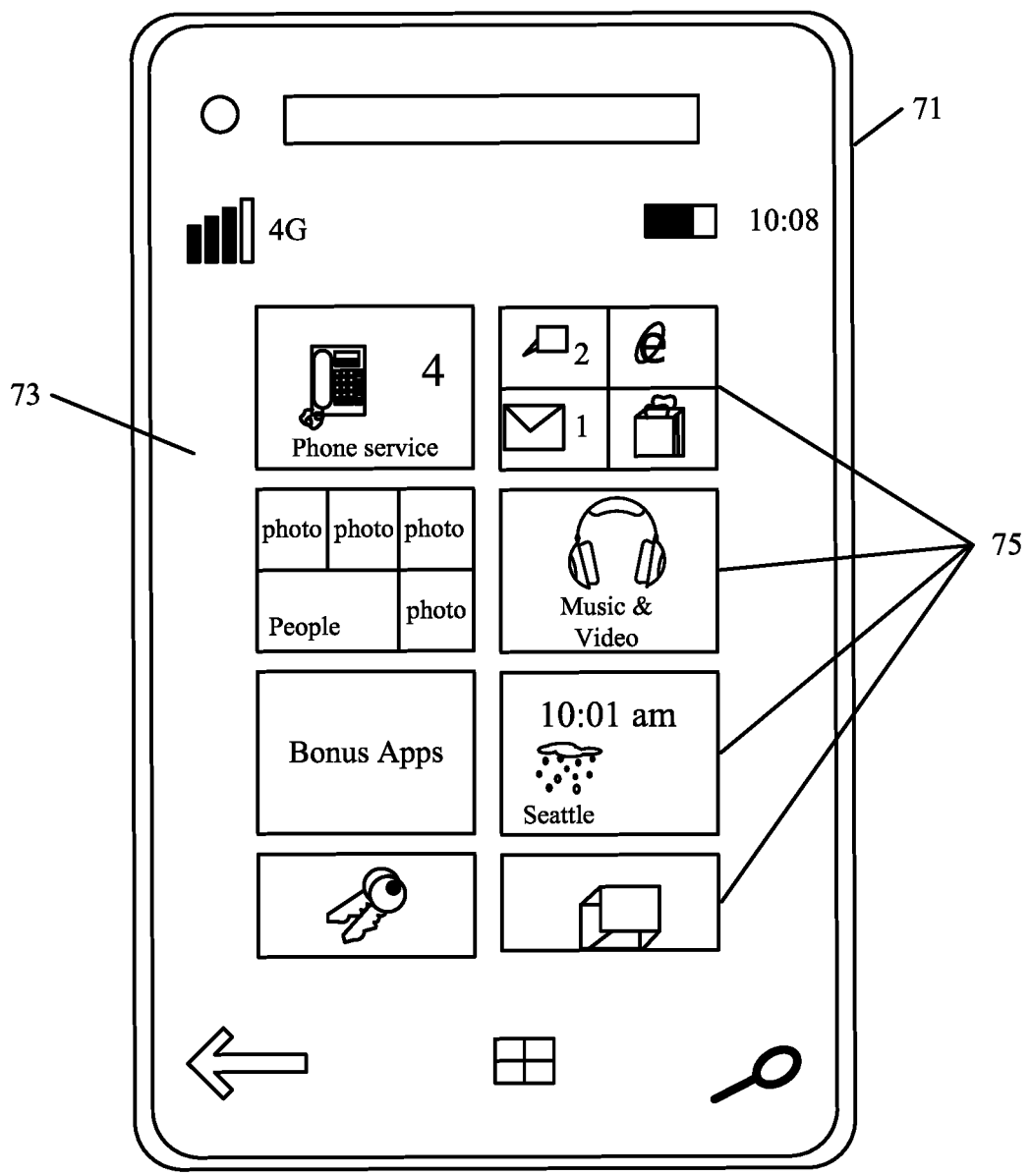

FIG. 17 is a simplified block diagram of one illustrative example of a handheld or mobile computing device that can be used as a user's or client's handheld device 16, in which the present system (or parts of the present system) can be deployed. For instance, a mobile device can be deployed in the operator compartment of agricultural machine 500 or as remote system 556. FIGS. 18-19 are examples of handheld or mobile devices.

FIG. 17 provides a general block diagram of the components of device 16 that can run some components shown in FIG. 15, that interacts with them, or both. In the device 16, a communications link 13 is provided that allows the handheld device to communicate with other computing devices and under some embodiments provides a channel for receiving information automatically, such as by scanning Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 18 shows one example in which device 16 is a tablet computer 50. In FIG. 18, computer 50 is shown with user interface display screen 52. Screen 52 can be a touch screen or a pen-enabled interface that receives inputs from a pen or stylus. Screen 52 can also use an on-screen virtual keyboard. Of course, Screen 52 might also be attached to a keyboard or other user input device through a suitable attachment mechanism, such as a wireless link or USB port, for instance. Computer 50 can also illustratively receive voice inputs as well.

FIG. 19 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 20:
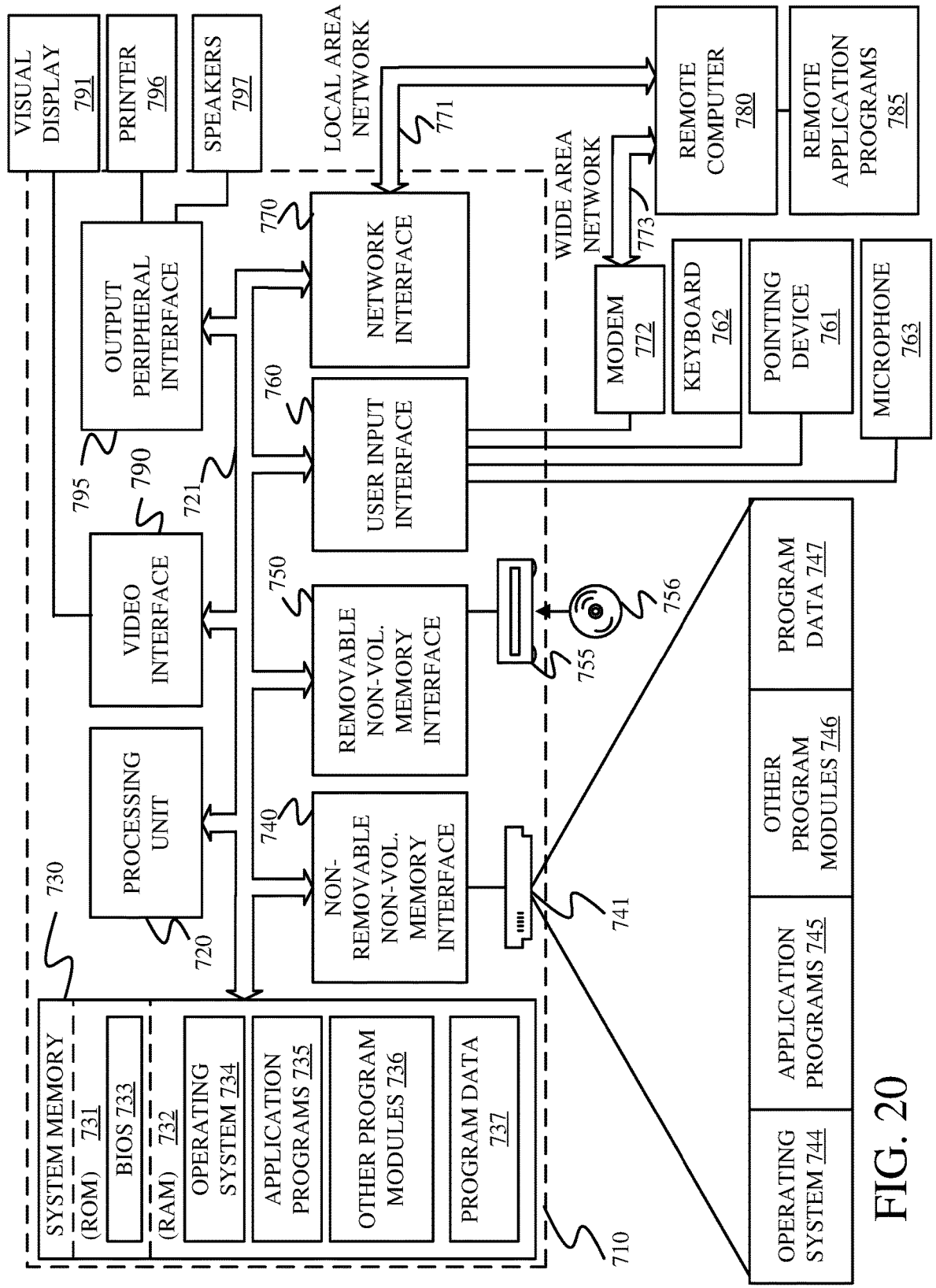
FIG. 20 is a block diagram showing one example of a computing environment that can be used in the architectures shown in the previous figures.

FIG. 20 is one example of a computing environment in which elements of FIG. 15, or parts of the elements, (for example) can be deployed. With reference to FIG. 20, an example system for implementing some embodiments includes a computing device in the form of a computer 710. Components of computer 710 may include, but are not limited to, a processing unit 720 (which can comprise processors or servers from previous FIGS.), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. Memory and programs described with respect to FIG. 15 can be deployed in corresponding portions of FIG. 20.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 20 illustrates operating system 734, application programs 735, other program modules 736, and program data 737.

The computer 710 may also include other removable/non-removable volatile/nonvolatile computer storage media. By way of example only, FIG. 20 illustrates a hard disk drive 741 that reads from or writes to non-removable, nonvolatile magnetic media, an optical disk drive 755, and nonvolatile optical disk 756. The hard disk drive 741 is typically connected to the system bus 721 through a non-removable memory interface such as interface 740, and optical disk drive 755 is typically connected to the system bus 721 by a removable memory interface, such as interface 750.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 20, provide storage of computer readable instructions, data structures, program modules and other data for the computer 710. In FIG. 20, for example, hard disk drive 741 is illustrated as storing operating system 744, application programs 745, other program modules 746, and program data 747. Note that these components can either be the same as or different from operating system 734, application programs 735, other program modules 736, and program data 737.

A user may enter commands and information into the computer 710 through input devices such as a keyboard 762, a microphone 763, and a pointing device 761, such as a mouse, trackball, or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures. A visual display 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections (such as a local area network—LAN, or wide area network—WAN or a controller area network—CAN) to one or more remote computers, such as a remote computer 780.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. In a networked environment, program modules may be stored in a remote memory storage device. FIG. 20 illustrates, for example, that remote application programs 785 can reside on remote computer 780.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural planting machine comprising:
    a seed meter configured to meter seed;
    a transport mechanism configured to transport the seed to a discharge location; and
    a loader assembly comprising:
        an element having an actuating surface;
        a hub configured to rotate relative to the actuating surface; and
        a compartment supported on the hub and configured to receive the seed from the seed meter and to eject the seed into the transport mechanism, the compartment comprising first and second movable elements that are movably coupled to the hub and configured to engage the actuating surface and move relative to the hub based on rotation of the hub relative to the actuating surface.

2. The agricultural planting machine of claim 1, wherein the actuating surface comprises one or more grooves, and the first movable element is rotated, relative to the hub, based on engagement with the one or more grooves.

3. The agricultural planting machine of claim 1, wherein the actuating surface comprises a cam track, and the first movable element comprises a cam follower.

4. The agricultural planting machine of claim 1, wherein the transport mechanism comprises an assistive transport mechanism.

5. The agricultural planting machine of claim 4, wherein the assistive transport mechanism comprises a belted conveyor.

6. The agricultural planting machine of claim 5, wherein the belted conveyor comprises a brush belt.

7. The agricultural planting machine of claim 5, wherein the belted conveyor is configured to rotate along a first plane, and the hub is configured to rotate along a second plane that is substantially perpendicular to the first plane.

8. The agricultural planting machine of claim 1, wherein the seed meter comprises a rotating element configured to meter seeds from a seed pool.

9. The agricultural planting machine of claim 8, wherein the rotating element comprises a rotating disc having a plurality of seed apertures configured to receive seeds from a seed hopper.

10. The agricultural planting machine of claim 8, wherein the rotating element is configured to rotate about a first axis and the hub is configured to rotate about a second axis that is oriented in a plane that is substantially perpendicular to the first axis.

11. The agricultural planting machine of claim 10, wherein the seed meter comprises a first meter and the hub comprises a first hub, and further comprising a second meter configured to meter granular material, the loader assembly comprising a second hub and a second compartment supported on the second hub, the second hub configured to load the granular material into the transport mechanism.

12. The agricultural planting machine of claim 11, wherein the granular material comprises at least one of fertilizer or seed.

13. The agricultural planting machine of claim 1, wherein the first movable element is configured to move from a first position where the first movable element engages seed from the seed meter and a second position that ejects the seed into the transport mechanism.

14. The agricultural planting machine of claim 1, wherein the compartment is at least partially formed by the first movable element and the second movable element that is movably coupled to the hub and engages the actuating surface.

15. An agricultural planting machine comprising:
    a seed meter configured to meter seed;
    a belted conveyor comprising a belt mounted on a rotatable element configured to rotate about a first axis, the belted conveyor configured to transport the seed to a discharge location; and
    a loader assembly comprising:
        a hub configured to rotate about a second axis in a plane that is substantially perpendicular to the first axis; and
        a compartment supported on the hub and configured to load the seed from the seed meter into the belted conveyor, the compartment comprising a movable element that is movably coupled to the hub and configured to eject the seed from the compartment into the belted conveyor.

16. The agricultural planting machine of claim 15, wherein the loader assembly comprises an element having an actuating surface, and the movable element is rotated, relative to the hub, based on engagement with the actuating surface.

17. The agricultural planting machine of claim 16, wherein the movable element is configured to move from a first position where the movable element engages seed from the seed meter and a second position that ejects the seed into the belted conveyor.

18. An agricultural planting machine comprising:
    a first meter configured to rotate about a first meter axis and meter a first granular material;
    a second meter configured to rotate about a second meter axis and meter a second granular material;
    a transport mechanism configured to transport the first granular material and the second granular material to a discharge location; and
    a loader assembly comprising:
        a first hub configured to rotate about a first hub axis in a plane that is substantially perpendicular to the first meter axis;

a first compartment supported on the first hub and configured to load the first granular material into the transport mechanism, the first compartment comprising a first movable element that is movably coupled to the first hub and configured to eject the first granular material from the first compartment into the transport mechanism;

a second hub configured to rotate about a second hub axis in a plane that is substantially perpendicular to the second meter axis; and a second compartment supported on the second hub and configured to load the second granular material into the transport mechanism, the second compartment comprising a second movable element that is movably coupled to the second hub and configured to eject the second granular material from the second compartment into the transport mechanism.

19. The agricultural planting machine of claim 18, wherein the loader assembly comprises an element disposed between the first hub and the second hub, each of the first and second hubs is configured to rotate relative to the element, the first movable element engages a first actuating surface of the element and moves relative to the first hub based on rotation of the first hub relative to the first actuating surface, and the second movable element engages a second actuating surface of the element and moves relative to the second hub based on rotation of the second hub relative to the second actuating surface.

20. The agricultural planting machine of claim 18, wherein each granular material of the first granular material and the second granular material comprises one of seed or fertilizer.

* * * * *